United States Patent
Zhou et al.

(10) Patent No.: US 11,737,125 B2
(45) Date of Patent: Aug. 22, 2023

(54) USER EQUIPMENT FEEDBACK REDUCTION FOR SEMIPERSISTENT SCHEDULING

(71) Applicant: QUALCOMM Incorporated, San Diego, CA (US)

(72) Inventors: Yan Zhou, San Diego, CA (US); Tao Luo, San Diego, CA (US); Mahmoud Taherzadeh Boroujeni, San Diego, CA (US); Arumugam Chendamarai Kannan, San Diego, CA (US); Xiaoxia Zhang, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/149,510

(22) Filed: Jan. 14, 2021

(65) Prior Publication Data
US 2021/0282164 A1    Sep. 9, 2021

Related U.S. Application Data

(60) Provisional application No. 62/987,173, filed on Mar. 9, 2020.

(51) Int. Cl.
*H04W 72/50* (2023.01)
*H04W 72/1273* (2023.01)
(Continued)

(52) U.S. Cl.
CPC ........ *H04W 72/535* (2023.01); *H04B 7/0482* (2013.01); *H04L 1/1819* (2013.01);
(Continued)

(58) Field of Classification Search
CPC ......... H04W 72/1257; H04W 72/1273; H04W 72/1289; H04W 76/28; H04W 80/02;
(Continued)

(56) References Cited

U.S. PATENT DOCUMENTS

2018/0279274 A1\* 9/2018 Sun ...................... H04L 1/1896
2018/0279357 A1   9/2018 Zacharias et al.
(Continued)

FOREIGN PATENT DOCUMENTS

EP    2848082 B1    5/2019

OTHER PUBLICATIONS

International Search Report and Written Opinion—PCT/US2021/070048—ISA/EPO—May 5, 2021.
(Continued)

*Primary Examiner* — Sharmin Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission; and ignore the at least one SPS occasion of the set of SPS occasions by not transmitting a feedback message associated with the at least one SPS occasion. Numerous other aspects are provided.

30 Claims, 8 Drawing Sheets

(51) Int. Cl.
  *H04W 76/28* (2018.01)
  *H04L 5/00* (2006.01)
  *H04B 7/0456* (2017.01)
  *H04W 80/02* (2009.01)
  *H04L 1/1812* (2023.01)
  *H04W 72/23* (2023.01)

(52) U.S. Cl.
  CPC ....... *H04L 5/0055* (2013.01); *H04W 72/1273* (2013.01); *H04W 72/23* (2023.01); *H04W 76/28* (2018.02); *H04W 80/02* (2013.01)

(58) Field of Classification Search
  CPC ........... H04W 72/042; H04W 52/0212; H04W 52/0229; H04B 7/0482; H04L 1/1819; H04L 5/0055; H04L 1/1861; H04L 1/188; H04L 5/0096; H04L 1/1854; H04L 1/1864; Y02D 30/70
  See application file for complete search history.

(56) References Cited

U.S. PATENT DOCUMENTS

| | | | | |
|---|---|---|---|---|
| 2019/0074929 | A1* | 3/2019 | Aiba | H04W 72/042 |
| 2021/0227570 | A1* | 7/2021 | Park | H04W 76/27 |
| 2022/0053535 | A1* | 2/2022 | Xu | H04L 1/1861 |
| 2022/0070837 | A1* | 3/2022 | Yang | H04L 5/0055 |
| 2022/0132341 | A1* | 4/2022 | Lee | H04W 72/042 |
| 2022/0201724 | A1* | 6/2022 | Zhang | H04L 1/1854 |
| 2022/0239445 | A1* | 7/2022 | Yoshioka | H04W 72/1273 |

OTHER PUBLICATIONS

LG Electronics Inc: "Semi-Persistent Scheduling in NR", 3GPP TSG-RAN WG2 Meeting #98, 3GPP Draft; R2-1704496 Semi-Persistent Scheduling in NR, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017, May 4, 2017, pp. 1-3, XP051275059, Retrieved from the Internet: URL: http://www.3gpp.org/ftp/tsg_ran/WG2_RL2/TSGR2_98/Docs/ [retrieved on May 4, 2017], Paragraph 2.1 and 2.2, Section 2.1.

NTT DOCOMO, et al., "Physical Layer Enhancements for DL SPS", 3GPP TSG RAN WG1 #97, 3GPP Draft; R1-1906219, 3rd Generation Partnership Project (3GPP), Mobilecompetence Centre; 650, Route Deslucioles; F-06921 Sophia-Antipolis Cedex; France, vol. RAN WG1, No. Reno, USA; May 13, 2019-May 17, 2019, May 4, 2019 (May 4, 2019), pp. 1-7, XP051708258, Retrieved from the Internet: URL: http://www.3gpp.org/ftp/tsg%5Fran/WG1%5FRL1/TSGR1%5F97/Docs/R1%2D1906219%2Ezip [retrieved on May 4, 2019], Section 4.

* cited by examiner

USER EQUIPMENT FEEDBACK REDUCTION FOR SEMIPERSISTENT SCHEDULING

CROSS-REFERENCE TO RELATED APPLICATION

This patent application claims priority to U.S. Provisional Patent Application No. 62/987,173, filed on Mar. 9, 2020, entitled "UE FEEDBACK REDUCTION FOR SPS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for user equipment (UE) feedback reduction for semi-persistent scheduling (SPS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission; and ignoring the at least one SPS occasion of the set of SPS occasions by not transmitting a feedback message associated with the at least one SPS occasion.

In some aspects, a method of wireless communication, performed by a base station, may include transmitting, to a UE, an SPS skipping indicator that indicates a set of SPS occasions, of an SPS communication, to be skipped, wherein the set of SPS occasions to be skipped comprises at least one SPS occasion that will not include a PDSCH transmission; and transmitting the SPS communication.

In some aspects, a UE for wireless communication may include a memory and one or more processors operatively coupled to the memory. The memory and the one or more processors may be configured to receive, from a base station, an SPS skipping indicator that indicates a set of SPS occasions, of an SPS communication, to be skipped, wherein the set of SPS occasions to be skipped comprises at least one SPS occasion that will not include a PDSCH transmission; and ignore the at least one SPS occasion of the set of SPS occasions by not transmitting a feedback message associated with the at least one SPS occasion.

In some aspects, a base station for wireless communication may include a memory and one or more processors operatively coupled to the memory. The memory and the one or more processors may be configured to transmit, to a UE, an SPS skipping indicator that indicates a set of SPS occasions, of an SPS communication, to be skipped, wherein the set of SPS occasions to be skipped comprises at least one SPS occasion that will not include a PDSCH transmission; and transmit the SPS communication.

In some aspects, a non-transitory computer-readable medium may store one or more instructions for wireless communication. The one or more instructions, when executed by one or more processors of a UE, may cause the one or more processors to receive, from a base station, an SPS skipping indicator that indicates a set of SPS occasions, of an SPS communication, to be skipped, wherein the set of SPS occasions to be skipped comprises at least one SPS occasion that will not include a PDSCH transmission; and ignore the at least one SPS occasion of the set of SPS occasions by not transmitting a feedback message associated with the at least one SPS occasion.

In some aspects, a non-transitory computer-readable medium may store one or more instructions for wireless communication. The one or more instructions, when executed by one or more processors of a base station, may cause the one or more processors to transmit, to a UE, an SPS skipping indicator that indicates a set of SPS occasions, of an SPS communication, to be skipped, wherein the set of SPS occasions to be skipped comprises at least one SPS occasion that will not include a PDSCH transmission; and transmit the SPS communication.

In some aspects, an apparatus for wireless communication may include means for receiving, from a base station, an SPS skipping indicator that indicates a set of SPS occasions, of an SPS communication, to be skipped, wherein the set of SPS occasions to be skipped comprises at least one SPS occasion that will not include a PDSCH transmission; and means for ignoring the at least one SPS occasion of the set of SPS occasions by not transmitting a feedback message associated with the at least one SPS occasion.

In some aspects, an apparatus for wireless communication may include means for transmitting, to a UE, an SPS skipping indicator that indicates a set of SPS occasions, of an SPS communication, to be skipped, wherein the set of SPS occasions to be skipped comprises at least one SPS occasion that will not include a PDSCH transmission; and means for transmitting the SPS communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
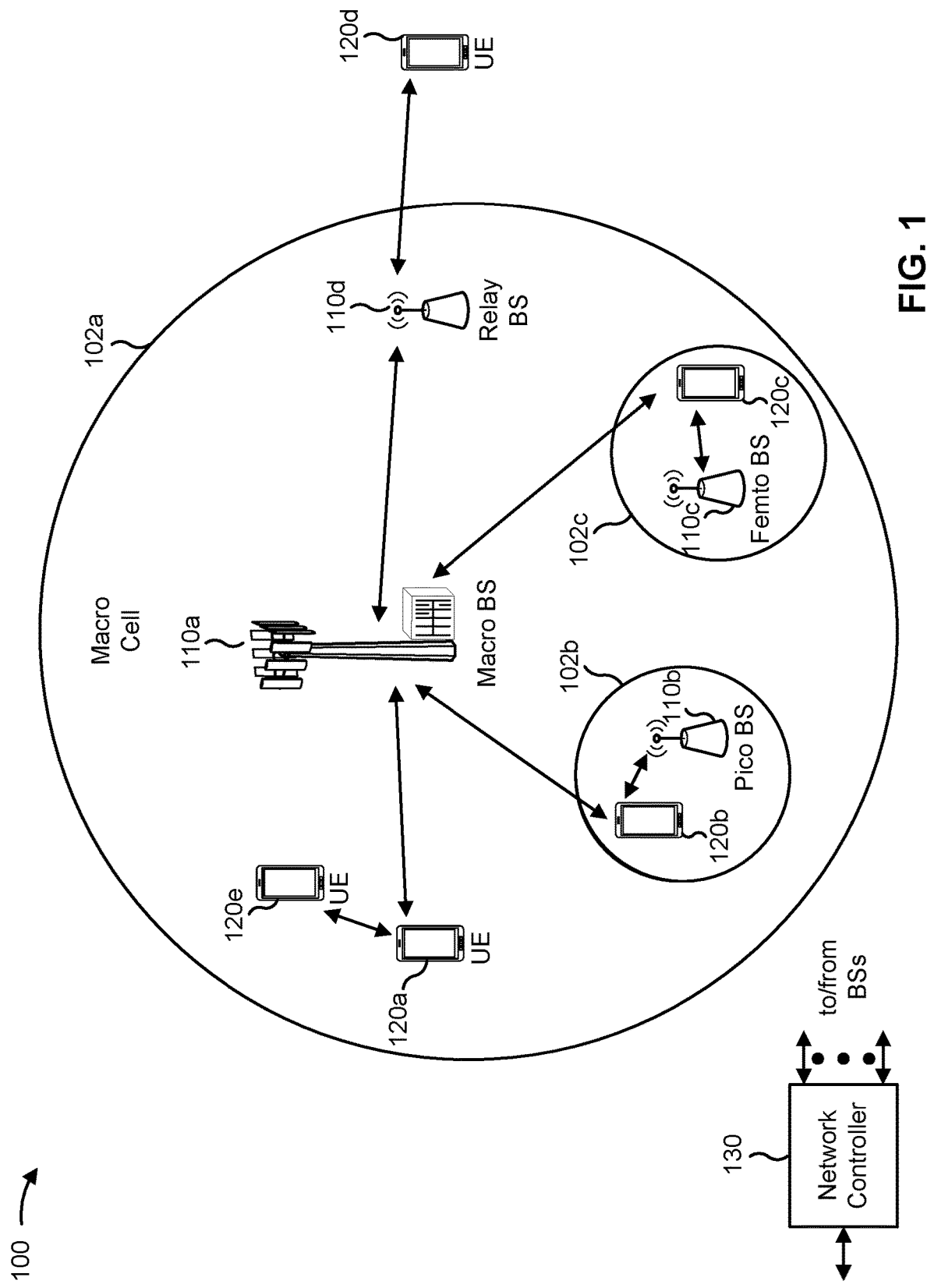
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
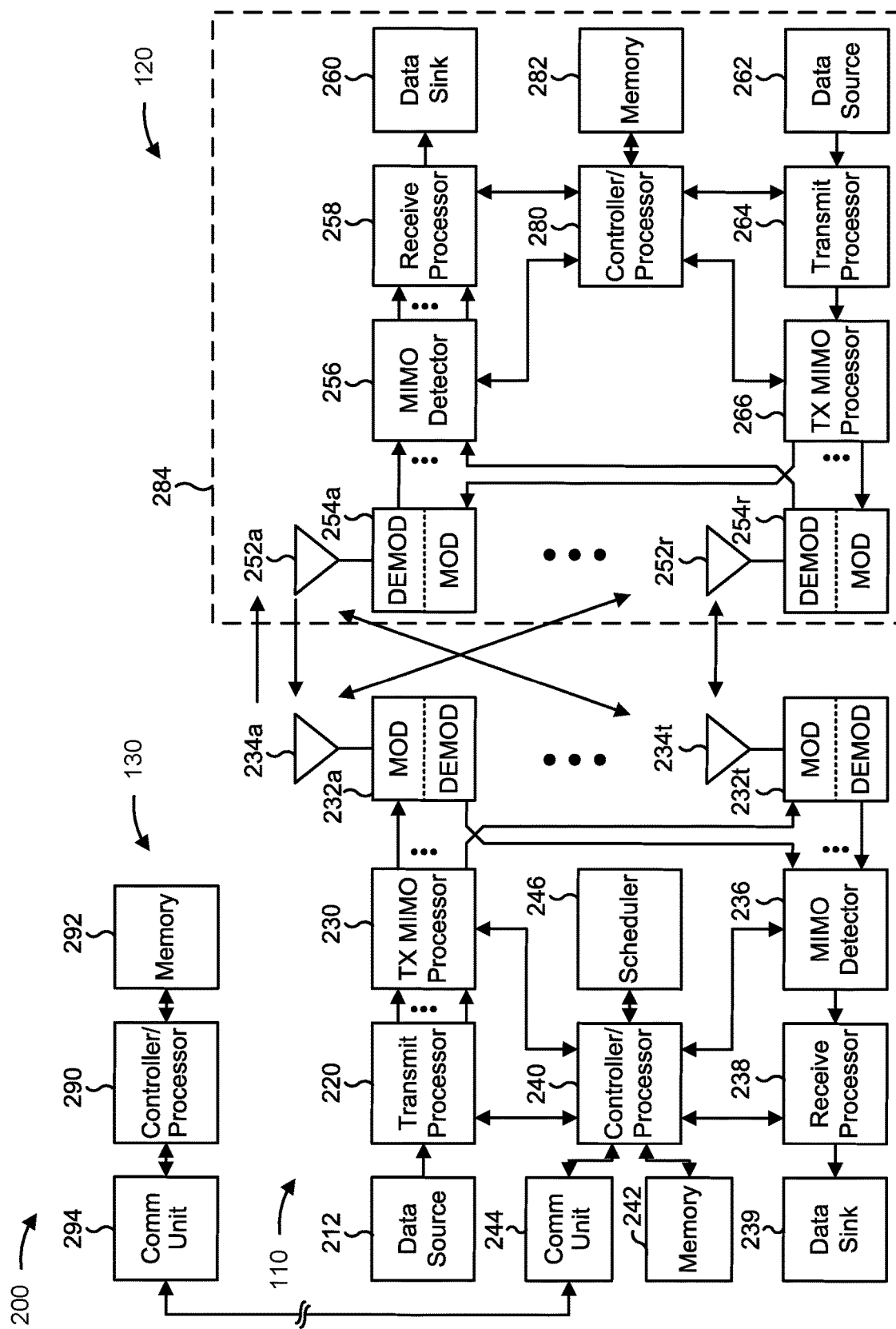
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with UE feedback reduction for semi-persistent scheduling (SPS), as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving, from a base station, an SPS skipping indicator that indicates a set of SPS occasions, of an SPS communication, to be skipped, wherein the set of SPS occasions to be skipped comprises at least one SPS occasion that will not include a physical downlink shared channel (PDSCH) transmission, means for ignoring the at least one SPS occasion of the set of SPS occasions by not transmitting a feedback message associated with the at least one SPS occasion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, an SPS skipping indicator that indicates a set of SPS occasions, of an SPS communication, to be skipped, wherein the set of SPS occasions to be skipped comprises at least one SPS occasion that will not include a PDSCH transmission, means for transmitting the SPS communication, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
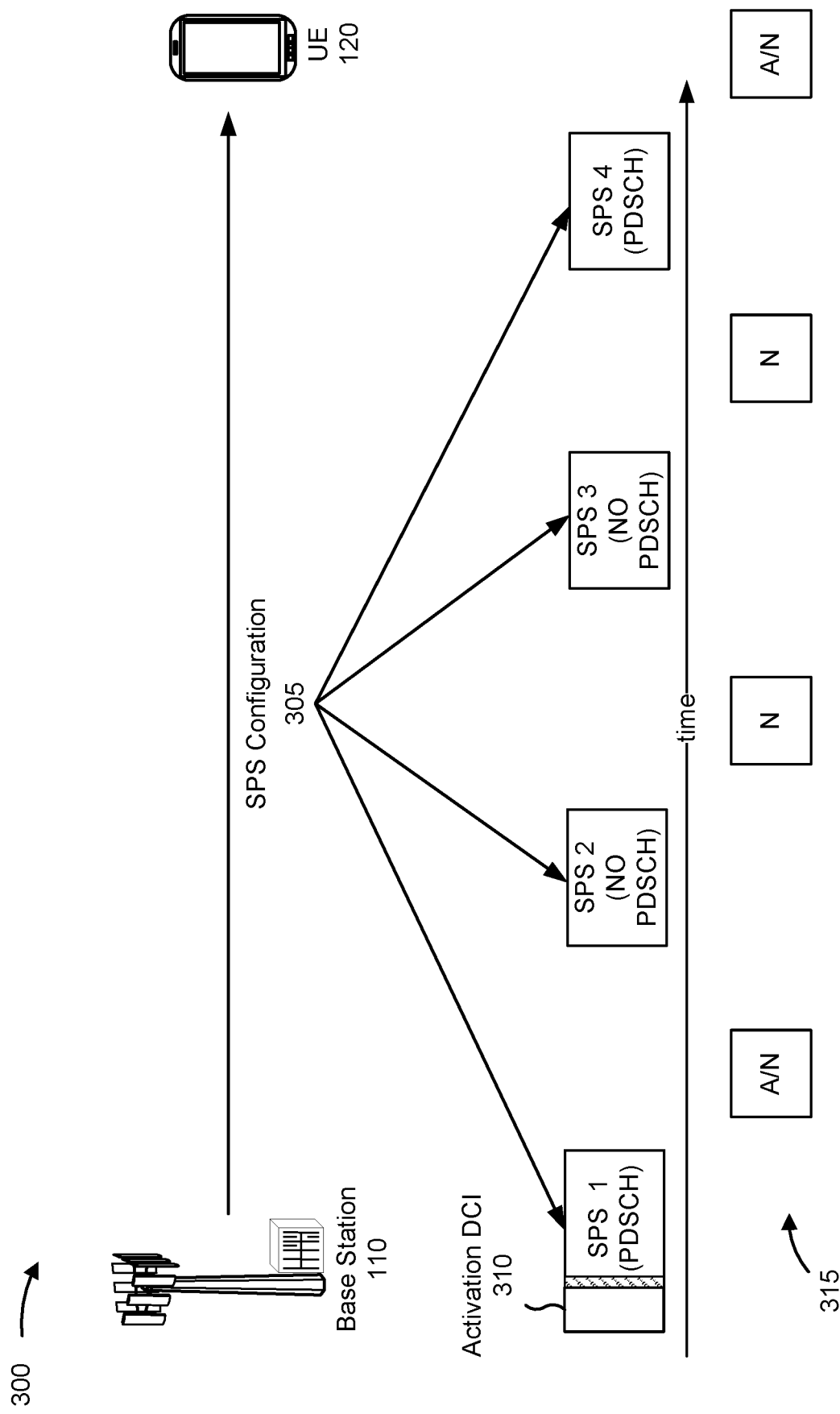
FIG. 3 is a diagram illustrating an example of an SPS configuration, in accordance with various aspects of the present disclosure.

FIG. 3 is a diagram illustrating an example 300 of an SPS configuration, in accordance with various aspects of the present disclosure. As shown, a base station 110 and a UE 120 may communicate with one another.

As shown by reference number 305, a base station 110 may transmit an SPS configuration to a UE 120 to configure an SPS communication, which may include a set of SPS occasions 305 (shown as "SPS 1," "SPS 2," "SPS 3," and "SPS 4") for the UE 120. SPS may be used to schedule a set of downlink transmissions (referred to as an SPS communication), each downlink transmission corresponding to an SPS occasion of a set of SPS occasions, for the UE 120 without requiring individual downlink grants (e.g., in DCI) for each downlink transmission, thereby conserving signaling overhead. For example, an SPS configuration may indicate a set of resources for the set of SPS occasions, such as time resources (e.g., according to a configured periodicity and/or time offset), frequency resources, physical resource blocks (PRBs), and/or the like. Additionally, or alternatively, the SPS configuration may indicate a set of transmission parameters for the set of SPS occasions, such as a modulation and coding scheme (MCS), a resource allocation, a transport block (TB) size, a beam, a transmission configuration indication (TCI) state, and/or the like. In some aspects, a base station 110 may transmit activation DCI 310 to the UE 120 to activate an SPS configuration. Upon receiving the activation DCI 310, the UE 120 may begin monitoring for SPS transmissions scheduled according to the SPS configuration.

As shown by reference 315, the UE 120 may transmit feedback messages to the base station 110 based at least in part on each SPS occasion of the SPS configuration 305. A feedback message may include an acknowledgment (shown as "A" and interchangeably referred to as "ACK"), a negative acknowledgment (shown as "N" and interchangeably referred to as "NACK"), and/or the like. The ACKs and NACKs may be, for example, hybrid automatic repeat request (HARD) feedback messages. Some SPS occasions may not include a PDSCH transmission. For example, some SPS occasions may be configured for retransmission of prior failed transmissions and, if prior transmissions are successful, the SPS occasions may include no data. In SPS, the UE 120 may transmit a NACK feedback message associated with an SPS occasion (e.g., SPS 2 and/or SPS 3), even if the SPS occasion does not include a PDSCH transmission.

This may increase uplink interference by increasing the quantity of uplink transmissions that may already be present. Additionally, or alternatively, transmitting feedback messages associated with SPS occasions that do not include PDSCH transmissions may increase UE power consumption as a result of the transmission itself and because the UE has to remain in an active state from the beginning of the SPS occasion until a retransmission timer expires after the UE transmits the feedback message.

Aspects of various techniques and apparatuses described herein may enable a base station 110 to provide, to a UE 120, an SPS skipping indicator that indicates a set of SPS occasions of an SPS communication, to be skipped. The set of SPS occasions to be skipped may include at least one SPS occasion that will not include a PDSCH transmission. In this way, the UE may ignore the indicated SPS occasions by not providing feedback messages associated therewith, by not performing SPS decoding associated with the indicated SPS occasions, and/or the like. This may facilitate saving resources and energy, as reactivation DCI need not be transmitted to the UE, the feedback messages are not transmitted, and the SPS occasions are not decoded. In some aspects, techniques described herein may enable the base station 110 to indicate multiple SPS occasions to be skipped, multiple SPS configurations having SPS occasions to be skipped, and/or the like. In this way, further resource and energy savings may be realized without additional signaling overhead.

As indicated above, FIG. 3 is provided as an example. Other examples may differ from what is described with regard to FIG. 3.

Figure 4:
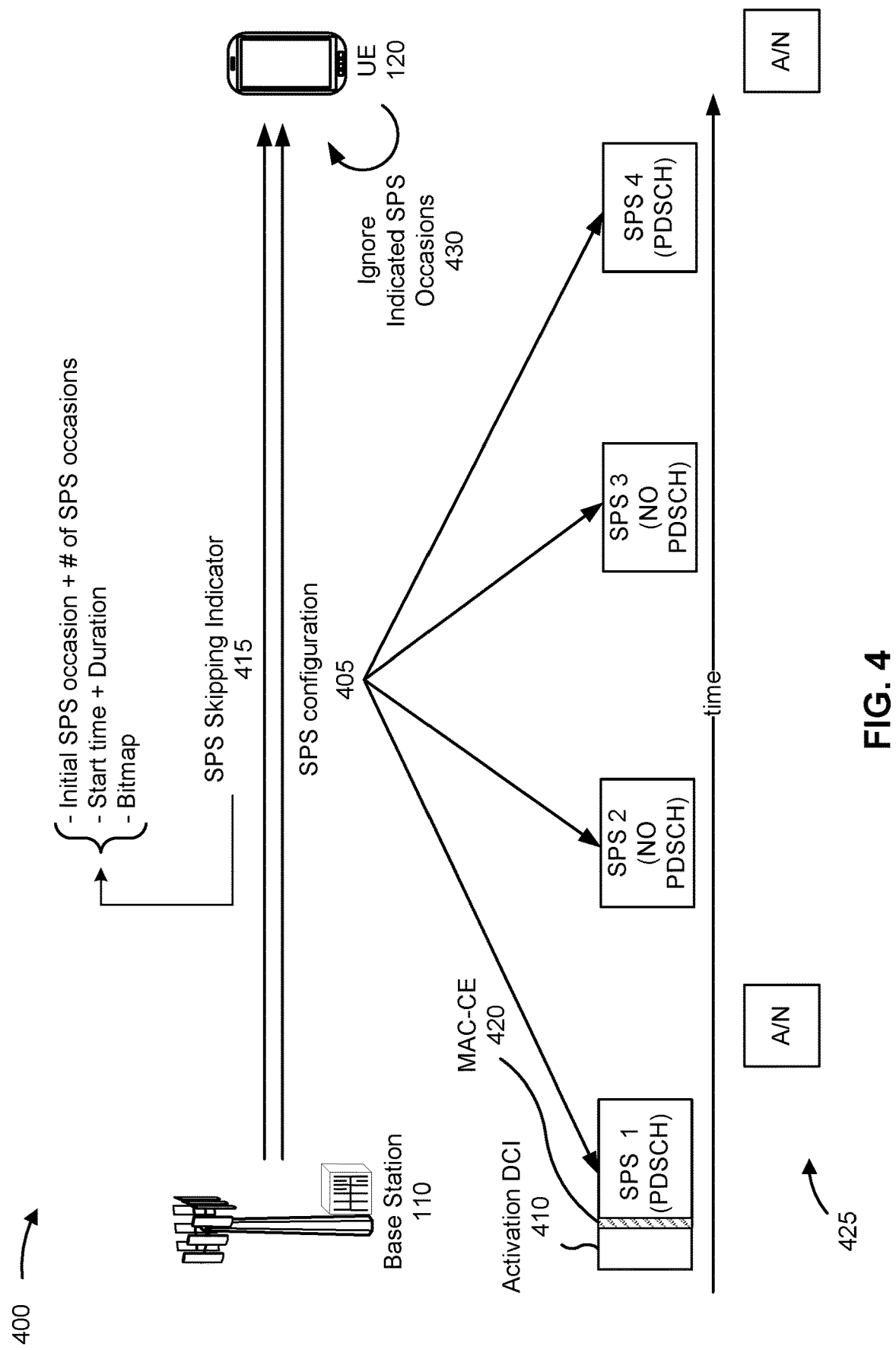
FIGS. 4-6 are diagrams illustrating examples of UE feedback reduction for SPS, in accordance with various aspects of the present disclosure.

FIG. 4 is a diagram illustrating an example 400 of UE feedback reduction for SPS, in accordance with various aspects of the present disclosure. As shown, a base station 110 and a UE 120 may communicate with one another.

As shown by reference number 405, the base station 110 may transmit an SPS configuration to the UE 120 to configure an SPS communication, which may include a set of SPS occasions (shown as "SPS 1," "SPS 2," "SPS 3," and "SPS 4"). As shown by reference 410, the base station 110 may transmit activation DCI to the UE 120 to activate the SPS configuration. Upon receiving the activation DCI, the UE 120 may begin monitoring for SPS transmissions scheduled according to the SPS configuration.

As shown by reference 415, the base station 110 may transmit, and the UE 120 may receive, an SPS skipping indicator that indicates a set of SPS occasions, of the SPS communication, to be skipped. The set of SPS occasions to be skipped may include at least one SPS occasion that will not include a PDSCH transmission. In some aspects, the SPS skipping indicator may indicate at least one additional set of SPS occasions to be skipped.

In some aspects, the SPS skipping indicator may be carried in a medium access control (MAC) control element (CE) (shown as "MAC-CE" 420). The MAC-CE 420 may be carried in a PDSCH transmission. In some aspects, as shown, the PDSCH transmission may include an SPS PDSCH transmission (SPS 1).

In some aspects, as shown in FIG. 4, the SPS skipping indicator may indicate an initial SPS occasion to occur of the set of SPS occasions to be skipped and a quantity (shown as "#") of SPS occasions of the set of SPS occasions to be skipped. In some aspects, the initial SPS occasion to occur may be indicated relative to an action time of the MAC-CE. The action time of the MAC-CE may include at least one of an end of an ACK message corresponding to the MAC-CE or an end of a specified time period that begins after the end of the ACK message corresponding to the MAC-CE. In some aspects, the SPS skipping indicator may not indicate an initial SPS occasion to occur of the SPS occasions to be skipped, in which case a default initial SPS occasion to occur of the SPS occasions to be skipped may include a next occasion to occur after an action time of the MAC-CE.

In some aspects, as shown in FIG. 4, the SPS skipping indicator may indicate a start time associated with the set of SPS occasions to be skipped and a duration of a time period associated with the set of SPS occasions to be skipped. In some aspects, the start time may be indicated relative to an action time of the MAC-CE. In some aspects, the start time may include a time that occurs after a specified time period beginning at the action time of the MAC-CE. In some aspects, the start time may be indicated relative to a start time of a frame associated with the MAC-CE or the action time of the MAC-CE.

In some aspects, as shown in FIG. 4, the SPS skipping indicator may include a bit map that indicates the set of SPS occasions to be skipped. In some aspects, the bit map may correspond to a plurality of SPS occasions associated with a next cycle that occurs after a cycle containing an action time of the MAC-CE. The bit map may correspond to a specified quantity of SPS occasions occurring after an action time of the MAC-CE. In some aspects, the specified quantity may include a fixed quantity configured in a radio resource control (RRC) message, a dynamically-indicated quantity indicated in the MAC-CE, and/or the like.

As shown by reference 425, the UE 120 may transmit feedback messages to the base station 110 based at least in part on some SPS occasions of the SPS configuration 405. A feedback message may include an acknowledgment (shown as "A" and interchangeably referred to as "ACK"), a negative acknowledgment (shown as "N" and interchangeably referred to as "NACK"), and/or the like. The ACKs and NACKs may be, for example, HARQ feedback messages.

As shown by reference number 430, the UE 120 may ignore the at least one SPS occasion of the indicated set of SPS occasions. The UE 120 may ignore an SPS occasion by not transmitting a feedback message associated with the SPS occasion, by not performing SPS decoding associated with the SPS occasion, and/or the like. In some aspects, as indicated above, the SPS skipping indicator may indicate at least one additional set of SPS occasions to be skipped. The at least one additional set of SPS occasions may correspond to the SPS configuration associated with reference number 405 and/or another SPS configuration. In some aspects, the UE 120 may ignore each SPS occasion of the at least one additional set of SPS occasions to be skipped.

As indicated above, FIG. 4 is provided as an example. Other examples may differ from what is described with regard to FIG. 4.

Figure 5:
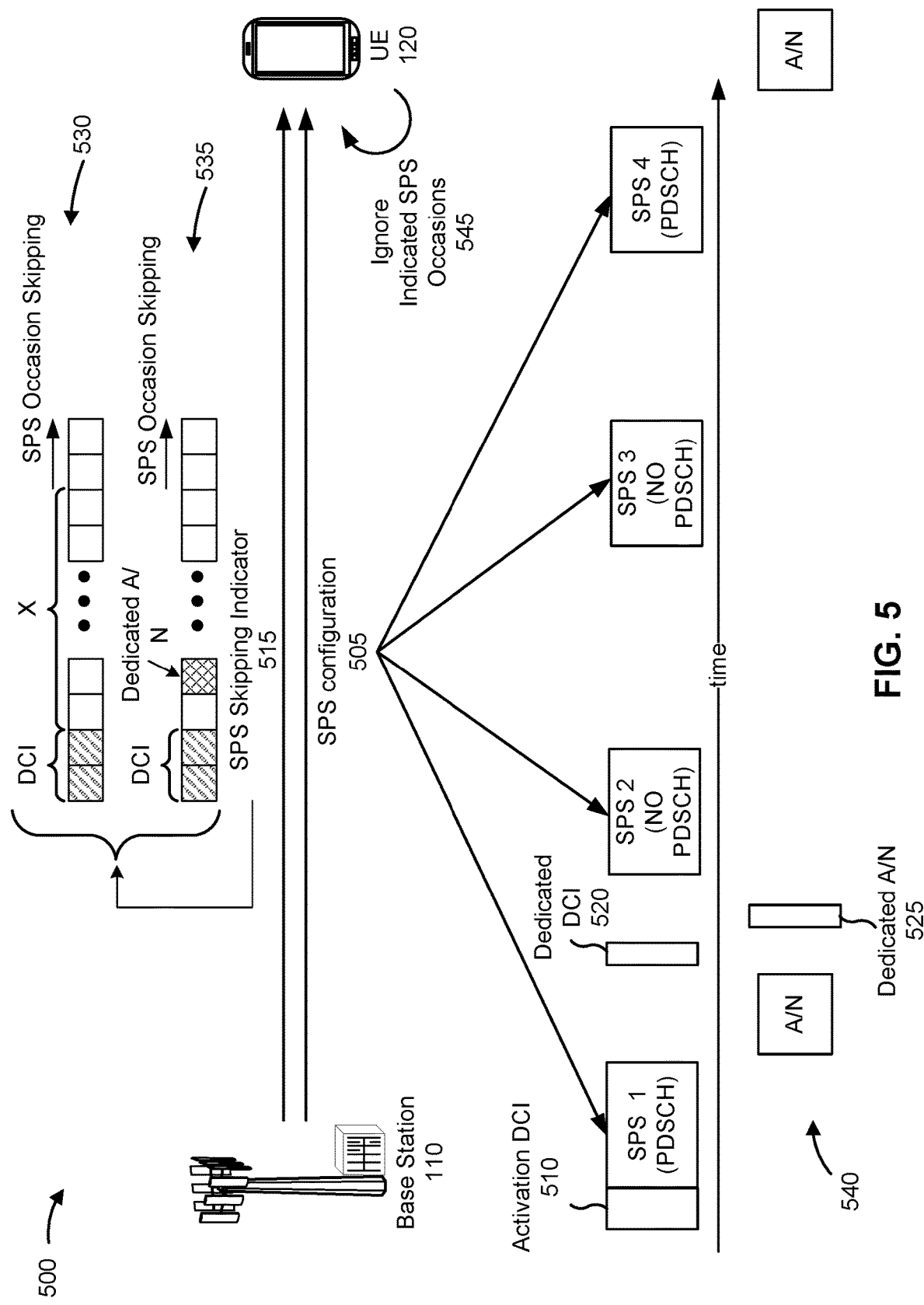

FIG. 5 is a diagram illustrating an example 500 of UE feedback reduction for SPS, in accordance with various aspects of the present disclosure. As shown, a base station 110 and a UE 120 may communicate with one another.

As shown by reference number 505, the base station 110 may transmit an SPS configuration to the UE 120 to configure an SPS communication, which may include a set of SPS occasions (shown as "SPS 1," "SPS 2," "SPS 3," and "SPS 4"). As shown by reference 510, the base station 110 may transmit activation DCI to the UE 120 to activate the SPS configuration. Upon receiving the activation DCI, the UE 120 may begin monitoring for SPS transmissions scheduled according to the SPS configuration.

As shown by reference 515, the base station 110 may transmit, and the UE 120 may receive, an SPS skipping indicator that indicates a set of SPS occasions, of the SPS communication, to be skipped. The set of SPS occasions to be skipped may include at least one SPS occasion that will not include a PDSCH transmission. In some aspects, the SPS skipping indicator may indicate at least one additional set of SPS occasions to be skipped.

In some aspects, the SPS skipping indicator may be carried in a DCI transmission. The DCI transmission may be carried in any control resource set, synchronization signal, and/or the like. In some aspects, the base station 110 may transmit, and the UE 120 may receive, an RRC message that configures one or more data fields in the DCI transmission to carry the SPS skipping indicator.

In some aspects, the DCI transmission may include a legacy DCI format specified by a wireless communication standard that schedules at least one of uplink signals or downlink signals. For example, in some aspects, the DCI transmission may include the activation DCI shown by reference number 510. In some aspects, as shown by reference number 520, the DCI transmission may include a dedicated DCI format that is dedicated to carrying an SPS skipping indicator. In some aspects, the DCI transmission does not affect one or more discontinuous reception (DRX) timers. The one or more DRX timers may include a DRX inactivity timer, a DRX downlink retransmission timer, a DRX uplink retransmission timer, a DRX hybrid automatic repeat request (HARQ) downlink retransmission timer, a DRX HARQ uplink retransmission timer, and/or the like.

In some aspects, as shown by reference number 525, the UE 120 may transmit, and the base station 110 may receive, a dedicated feedback message that includes an acknowledgement or a negative acknowledgment (A/N) associated with receiving the DCI transmission. In some aspects, the dedicated feedback message may correspond to at least one of a HARQ-ACK codebook type one, a HARQ-ACK codebook type 2, a HARQ-ACK codebook type 3, and/or the like.

In some aspects, the SPS skipping indicator may indicate an initial SPS occasion to occur of the set of SPS occasions to be skipped. The initial SPS occasion to occur may be indicated relative to an action time of the DCI transmission. In some aspects, as shown by reference number 530, the initial SPS occasion to occur may include an SPS occasion that occurs a specified quantity (shown as "X") of symbols after an end of the DCI transmission. The DCI transmission may be associated with a dedicated feedback message or not.

As shown by reference number 535, in some aspects, the initial SPS occasion to occur may include an SPS occasion that occurs a specified quantity, X, of symbols after an end of an uplink feedback transmission (shown as "DEDICATED A/N") associated with the DCI transmission. In some aspects, the specified quantity, X, of symbols may be based at least in part on at least one of: a subcarrier spacing (SCS) of a scheduling component carrier (CC) carrying the DCI transmission, an SCS of a CC carrying the SPS communication, an SCS of a CC carrying an uplink feedback transmission associated with the DCI transmission, and/or the like.

In some aspects, the initial SPS occasion to occur may be indicated relative to an action time of a MAC-CE. The action time of the MAC-CE may include at least one of an end of an acknowledgement (ACK) message corresponding to the MAC-CE or an end of a specified time period that begins after the end of the ACK message corresponding to the MAC-CE. In some aspects, the SPS skipping indicator may not indicate an initial SPS occasion to occur of the SPS occasions to be skipped, in which case a configured default initial SPS occasion to occur of the SPS occasions to be skipped may include a next occasion to occur after an action time of a MAC-CE.

In some aspects, the start time associated with the set of SPS occasions to be skipped may be indicated relative to an action time of a MAC-CE. The start time may include a time that occurs after a specified time period beginning at the action time of the MAC-CE. In some aspects, the start time may be indicated relative to a start time of a frame associated with the MAC-CE.

In some aspects, the bit map that indicates the set of SPS occasions to be skipped may correspond to a plurality of SPS occasions associated with a next cycle that occurs after a cycle containing an action time of a MAC-CE. In some aspects, the bit map may correspond to a specified quantity of SPS occasions occurring after an action time of the MAC-CE. The specified quantity may include a fixed quantity configured in an RRC message, a dynamically-indicated quantity indicated in the MAC-CE, and/or the like.

As shown by reference number 540, the UE 120 may transmit feedback messages to the base station 110 based at least in part on some SPS occasions of the SPS configuration 505. As shown by reference number 545, the UE 120 may ignore the at least one SPS occasion of the indicated set of SPS occasions. The UE 120 may ignore an SPS occasion by not transmitting a feedback message associated with the SPS occasion, by not performing SPS decoding associated with the SPS occasion, and/or the like. In some aspects, as indicated above, the SPS skipping indicator may indicate at least one additional set of SPS occasions to be skipped. The at least one additional set of SPS occasions may correspond to the SPS configuration associated with reference number 505 and/or another SPS configuration. In some aspects, the UE 120 may ignore each SPS occasion of the at least one additional set of SPS occasions to be skipped.

As indicated above, FIG. 5 is provided as an example. Other examples may differ from what is described with regard to FIG. 5.

Figure 6:
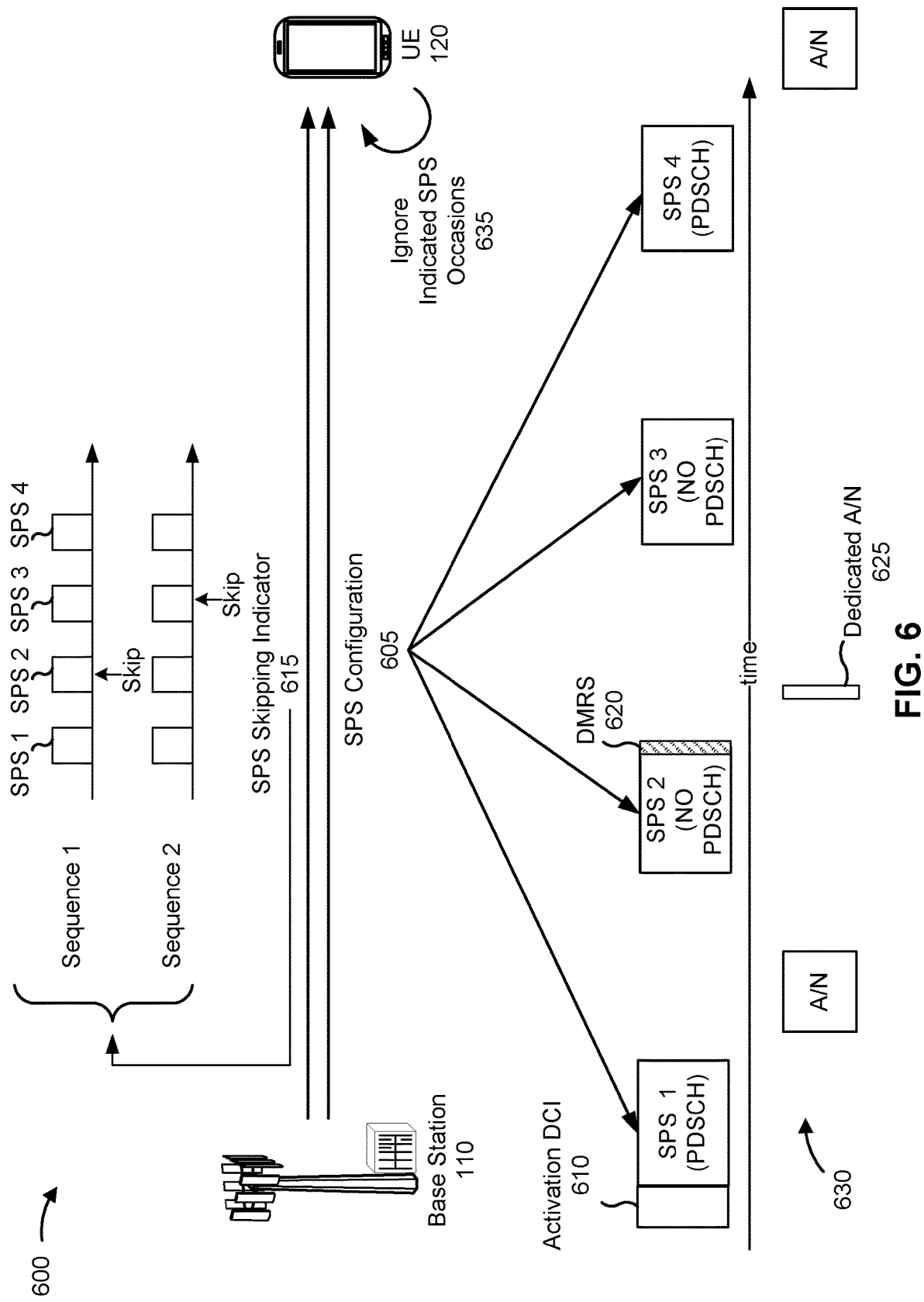

FIG. 6 is a diagram illustrating an example 600 of UE feedback reduction for SPS, in accordance with various aspects of the present disclosure. As shown, a base station 110 and a UE 120 may communicate with one another.

As shown by reference number 605, the base station 110 may transmit an SPS configuration to the UE 120 to configure an SPS communication, which may include a set of SPS occasions (shown as "SPS 1," "SPS 2," "SPS 3," and "SPS 4"). As shown by reference 610, the base station 110 may transmit SPS activation DCI to the UE 120 to activate the SPS configuration. Upon receiving the activation DCI, the UE 120 may begin monitoring for SPS transmissions scheduled according to the SPS configuration.

As shown by reference 615, the base station 110 may transmit, and the UE 120 may receive, an SPS skipping indicator that indicates a set of SPS occasions, of the SPS communication, to be skipped. The set of SPS occasions to be skipped may include at least one SPS occasion that will not include a PDSCH transmission. In some aspects, the SPS skipping indicator may indicate at least one additional set of SPS occasions to be skipped.

In some aspects, the SPS skipping indicator may be indicated by a downlink sequence. The downlink sequence may include a demodulation reference signal (shown as DMRS 620), a channel state information reference signal, and/or the like. In some aspects, the downlink sequence may be carried in a resource allocation associated with the SPS occasion.

As shown in FIG. 6, the downlink sequence may include a DMRS 620 carried in one or more symbols of an SPS occasion to be skipped (shown as SPS 2). In some aspects, the one or more symbols of the SPS occasion SPS 2 are an ending one or more symbols of the SPS occasion SPS 2. In some aspects, the downlink sequence is carried outside of a resource allocation associated with the SPS occasion SPS 2.

As shown by reference number 625, the UE 120 may transmit, and the base station 110 may receive, a dedicated feedback message (shown as "DEDICATED A/N") that includes an acknowledgement or a negative acknowledgment associated with receiving the downlink sequence. In some aspects, the dedicated feedback message may correspond to a HARQ-ACK codebook type one, a HARQ-ACK codebook type 2, a HARQ-ACK codebook type 3, and/or the like.

As shown in FIG. 6, the set of SPS occasions to be skipped indicated by the downlink sequence may include an SPS occasion SPS 2 associated with the downlink sequence. In some aspects, the set of SPS occasions to be skipped indicated by the downlink sequence may include a plurality of SPS occasions associated with the downlink sequence.

In some aspects, different downlink sequences may correspond to different sets of SPS occasions to be skipped. In some aspects, for example, as shown in FIG. 6 in connection with reference number 615, a first downlink sequence (shown as "SEQUENCE 1") may indicate SPS 2 as an SPS occasion to skip, while a second downlink sequence (shown as "SEQUENCE 2") may indicate SPS 3 as an SPS occasion to skip.

In some aspects, the downlink sequence may indicate a first start time associated with the set of SPS occasions to be skipped and a first duration of a time period associated with the set of SPS occasions to be skipped. Another downlink sequence may indicate a second start time associated with the set of SPS occasions to be skipped and a second duration of a time period associated with the set of SPS occasions to be skipped.

In some aspects, the SPS skipping indicator may indicate an initial SPS occasion to occur of the set of SPS occasions to be skipped. The initial SPS occasion to occur may be indicated relative to an action time of the downlink sequence. In some aspects, the initial SPS occasion to occur may include an SPS occasion that occurs a specified quantity of symbols after an end of the downlink sequence. In some aspects, the download sequence may be associated with a dedicated feedback message (DEDICATED A/N). In some aspects, the download sequence may not be associated with a dedicated feedback message.

In some aspects, the initial SPS occasion to occur may include an SPS occasion that occurs a specified quantity of symbols after an end of an uplink feedback transmission associated with the downlink sequence.

As shown by reference 630, the UE 120 may transmit feedback messages to the base station 110 based at least in part on some SPS occasions of the SPS configuration 605. As shown by reference number 635, the UE 120 may ignore the at least one SPS occasion of the indicated set of SPS occasions. The UE 120 may ignore an SPS occasion by not transmitting a feedback message associated with the SPS occasion, by not performing SPS decoding associated with the SPS occasion, and/or the like. In some aspects, as indicated above, the SPS skipping indicator may indicate at least one additional set of SPS occasions to be skipped. The at least one additional set of SPS occasions may correspond to the SPS configuration associated with reference number 605 and/or another SPS configuration. In some aspects, the UE 120 may ignore each SPS occasion of the at least one additional set of SPS occasions to be skipped.

As indicated above, FIG. 6 is provided as an example. Other examples may differ from what is described with regard to FIG. 6.

Figure 7:
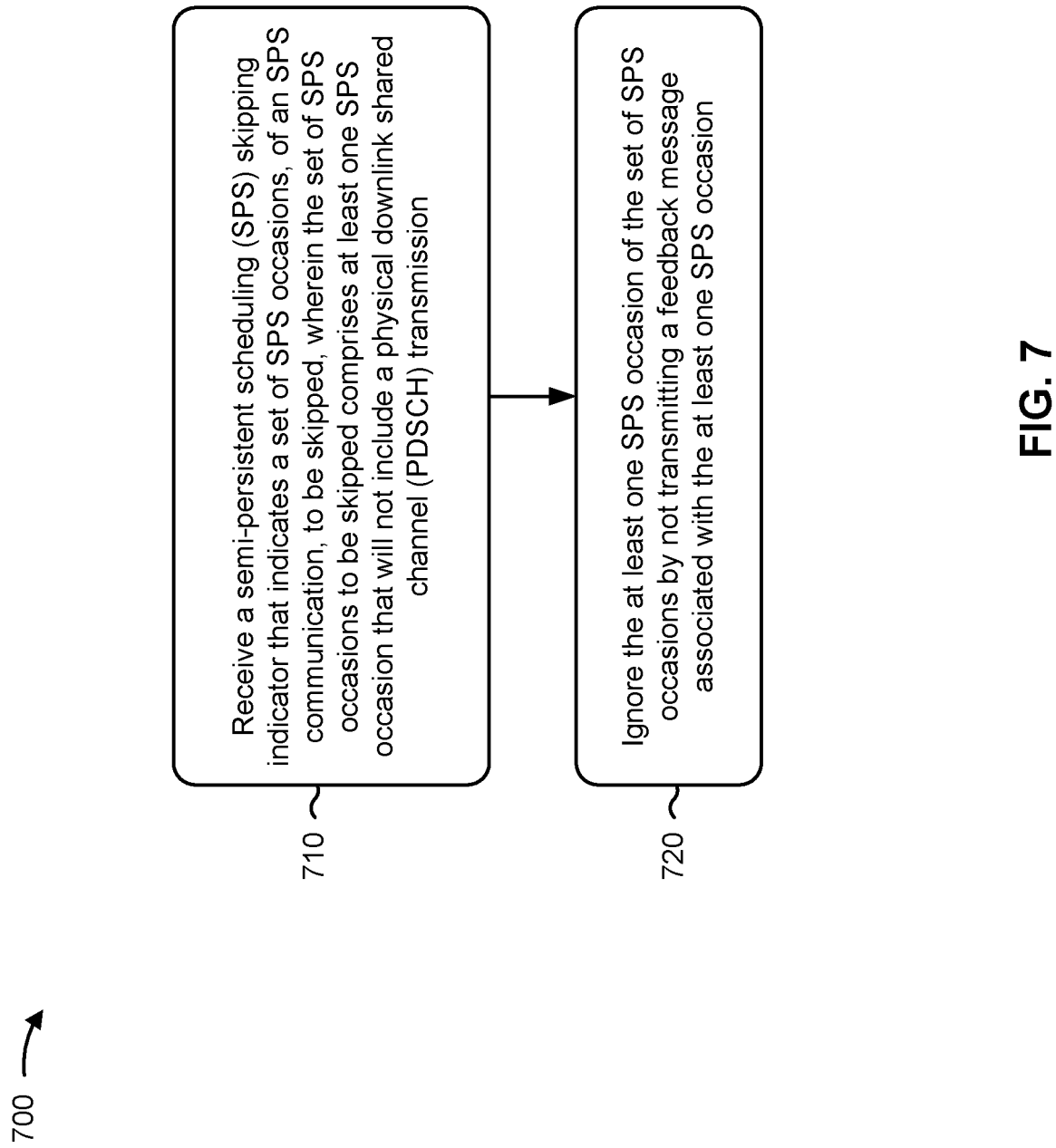
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with UE feedback reduction for SPS.

As shown in FIG. 7, in some aspects, process 700 may include receiving, from a base station, an SPS skipping indicator that indicates a set of SPS occasions, of an SPS communication, to be skipped, wherein the set of SPS occasions to be skipped comprises at least one SPS occasion that will not include a PDSCH transmission (block 710). For example, the UE (e.g., using receive processor 258, controller/processor 280, memory 282, and/or the like) may receive, from a base station, an SPS skipping indicator that indicates a set of SPS occasions, of an SPS communication, to be skipped, as described above. In some aspects, the set of SPS occasions to be skipped comprises at least one SPS occasion that will not include a PDSCH transmission.

As further shown in FIG. 7, in some aspects, process 700 may include ignoring the at least one SPS occasion of the set of SPS occasions by not transmitting a feedback message associated with the at least one SPS occasion (block 720). For example, the UE (e.g., using transmit processor 264, controller/processor 280, memory 282, and/or the like) may transmit feedback messages associated with SPS occasions having PDSCH transmissions and may ignore the at least one SPS occasion of the set of SPS occasions by not transmitting a feedback message associated with the at least one SPS occasion, as described above.

Process 700 may include additional aspects, such as any single aspect or any combination of aspects described below and/or in connection with one or more other processes described elsewhere herein.

In a first aspect, ignoring the at least one SPS occasion further comprises not performing SPS decoding associated with the at least one SPS occasion.

In a second aspect, alone or in combination with the first aspect, the SPS skipping indicator indicates at least one additional set of SPS occasions to be skipped, and process 700 includes ignoring each SPS occasion of the at least one additional set of SPS occasions to be skipped.

In a third aspect, alone or in combination with one or more of the first and second aspects, the SPS skipping indicator indicates: an initial SPS occasion to occur of the set of SPS occasions to be skipped, and a quantity of SPS occasions of the set of SPS occasions to be skipped.

In a fourth aspect, alone or in combination with one or more of the first through third aspects, the SPS skipping indicator indicates: a start time associated with the set of SPS occasions to be skipped, and a duration of a time period associated with the set of SPS occasions to be skipped.

In a fifth aspect, alone or in combination with one or more of the first through fourth aspects, the SPS skipping indicator comprises a bit map that indicates the set of SPS occasions to be skipped.

In a sixth aspect, alone or in combination with one or more of the first through fifth aspects, the SPS skipping indicator is carried in a MAC-CE.

In a seventh aspect, alone or in combination with the sixth aspect, the MAC-CE is carried in a PDSCH transmission.

In an eighth aspect, alone or in combination with the seventh aspect, the PDSCH transmission comprises an SPS PDSCH transmission.

In a ninth aspect, alone or in combination with one or more of the seventh through eighth aspects, the SPS skipping indicator indicates an initial SPS occasion to occur of the set of SPS occasions to be skipped, wherein the initial SPS occasion to occur is indicated relative to an action time of the MAC-CE.

In a tenth aspect, alone or in combination with the ninth aspect, the action time of the MAC-CE comprises at least one of an end of an ACK message corresponding to the MAC-CE or an end of a specified time period that begins after the end of the ACK message corresponding to the MAC-CE.

In an eleventh aspect, alone or in combination with one or more of the sixth through seventh aspects, the SPS skipping indicator does not indicate an initial SPS occasion to occur of the SPS occasions to be skipped, and a default initial SPS occasion to occur of the SPS occasions to be skipped comprises a next occasion to occur after an action time of the MAC-CE.

In a twelfth aspect, alone or in combination with one or more of the sixth through seventh aspects, the SPS skipping indicator indicates a start time associated with the set of SPS occasions to be skipped, wherein the start time is indicated relative to an action time of the MAC-CE.

In a thirteenth aspect, alone or in combination with the twelfth aspect, the start time comprises a time that occurs after a specified time period beginning at the action time of the MAC-CE.

In a fourteenth aspect, alone or in combination with the twelfth aspect, the start time is indicated relative to a start time of a frame associated with the MAC-CE or the action time of the MAC-CE.

In a fifteenth aspect, alone or in combination with one or more of the sixth through seventh aspects, the SPS skipping indicator comprises a bit map that indicates the set of SPS occasions to be skipped, wherein the bit map corresponds to a plurality of SPS occasions associated with a next cycle that occurs after a cycle containing an action time of the MAC-CE.

In a sixteenth aspect, alone or in combination with the fifteenth aspect, the bit map corresponds to a specified quantity of SPS occasions occurring after an action time of the MAC-CE.

In a seventeenth aspect, alone or in combination with the sixteenth aspect, the specified quantity comprises a fixed quantity configured in an RRC message.

In an eighteenth aspect, alone or in combination with the sixteenth aspect, the specified quantity comprises a dynamically-indicated quantity indicated in the MAC-CE.

In a nineteenth aspect, alone or in combination with the first aspect, the SPS skipping indicator is carried in a DCI transmission.

In a twentieth aspect, alone or in combination with the nineteenth aspect, process 700 includes receiving, from the base station, a radio resource control message that configures one or more data fields in the DCI transmission to carry the SPS skipping indicator.

In a twenty-first aspect, alone or in combination with one or more of the nineteenth through twentieth aspects, the DCI transmission comprises a DCI format that schedules at least one of uplink signals or downlink signals.

In a twenty-second aspect, alone or in combination with one or more of the nineteenth through twenty-first aspects, the DCI transmission comprises a dedicated DCI format.

In a twenty-third aspect, alone or in combination with the twenty-second aspect, the DCI transmission does not affect one or more DRX timers, the one or more DRX timers comprising at least one of: a DRX inactivity timer, a DRX downlink retransmission timer, a DRX uplink retransmission timer, a DRX HARQ downlink retransmission timer, a DRX HARQ uplink retransmission timer, or a combination thereof.

In a twenty-fourth aspect, alone or in combination with one or more of the twenty-second through twenty-third aspects, process 700 includes transmitting, to the base station, a dedicated feedback message that includes an acknowledgement or a negative acknowledgment associated with receiving the DCI transmission.

In a twenty-fifth aspect, alone or in combination with the twenty-fourth aspect, the dedicated feedback message corresponds to at least one of a HARQ-ACK codebook type one, a HARQ-ACK codebook type 2, or a HARQ-ACK codebook type 3.

In a twenty-sixth aspect, alone or in combination with one or more of the nineteenth through twenty-fifth aspects, the SPS skipping indicator indicates an initial SPS occasion to occur of the SPS occasions to be skipped, wherein the initial SPS occasion to occur is indicated relative to an action time of a MAC-CE.

In a twenty-seventh aspect, alone or in combination with the twenty-sixth aspect, the action time of the MAC-CE comprises at least one of an end of an ACK message corresponding to the MAC-CE or an end of a specified time period that begins after the end of the ACK message corresponding to the MAC-CE.

In a twenty-eighth aspect, alone or in combination with the nineteenth aspect, the SPS skipping indicator does not indicate an initial SPS occasion to occur of the SPS occasions to be skipped, and a configured default initial SPS occasion to occur of the SPS occasions to be skipped comprises a next occasion to occur after an action time of a MAC-CE.

In a twenty-ninth aspect, alone or in combination with one or more of the nineteenth through twenty-eighth aspects, the SPS skipping indicator indicates a start time associated with the set of SPS occasions to be skipped, wherein the start time is indicated relative to an action time of a MAC-CE.

In a thirtieth aspect, alone or in combination with the twenty-ninth aspect, the start time comprises a time that occurs after a specified time period beginning at the action time of the MAC-CE.

In a thirty-first aspect, alone or in combination with one or more of the twenty-ninth through thirtieth aspects, the start time is indicated relative to a start time of a frame associated with the MAC-CE.

In a thirty-second aspect, alone or in combination with one or more of the nineteenth through thirty-first aspects, the SPS skipping indicator comprises a bit map that indicates the set of SPS occasions to be skipped, wherein the bit map corresponds to a plurality of SPS occasions associated with a next cycle that occurs after a cycle containing an action time of a MAC-CE.

In a thirty-third aspect, alone or in combination with the thirty-second aspect, the bit map corresponds to a specified quantity of SPS occasions occurring after an action time of the MAC-CE.

In a thirty-fourth aspect, alone or in combination with the thirty-third aspect, the specified quantity comprises a fixed quantity configured in a radio resource control message.

In a thirty-fifth aspect, alone or in combination with the thirty-third aspect, the specified quantity comprises a dynamically-indicated quantity indicated in the MAC-CE.

In a thirty-sixth aspect, alone or in combination with the nineteenth aspect, the SPS skipping indicator indicates an initial SPS occasion to occur of the set of SPS occasions to be skipped, wherein the initial SPS occasion to occur is indicated relative to an action time of the DCI transmission.

In a thirty-seventh aspect, alone or in combination with the thirty-sixth aspect, the initial SPS occasion to occur comprises an SPS occasion that occurs a specified quantity of symbols after an end of the DCI transmission.

In a thirty-eighth aspect, alone or in combination with the thirty-seventh aspect, the DCI transmission is associated with a dedicated feedback message.

In a thirty-ninth aspect, alone or in combination with the thirty-seventh aspect, the DCI transmission is not associated with a dedicated feedback message.

In a fortieth aspect, alone or in combination with one or more of the thirty-seventh through thirty-ninth aspects, the specified quantity of symbols is based at least in part on at least one of: an SCS of a scheduling CC carrying the DCI transmission, an SCS of a CC carrying the SPS communication, an SCS of a CC carrying an uplink feedback transmission associated with the DCI transmission, or a combination thereof.

In a forty-first aspect, alone or in combination with one or more of the thirty-seventh through fortieth aspects, the initial SPS occasion to occur comprises an SPS occasion that occurs a specified quantity of symbols after an end of an uplink feedback transmission associated with the DCI transmission.

In a forty-second aspect, alone or in combination with the forty-first aspect, the specified quantity of symbols is based at least in part on at least one of: an SCS of a scheduling CC carrying the DCI transmission, an SCS of a CC carrying the SPS communication, an SCS of a CC carrying an uplink feedback transmission associated with the DCI transmission, or a combination thereof.

In a forty-third aspect, alone or in combination with the first aspect, the SPS skipping indicator is indicated by a downlink sequence.

In a forty-fourth aspect, alone or in combination with the forty-third aspect, the downlink sequence comprises at least one of a demodulation reference signal, a channel state information reference signal, or a combination thereof.

In a forty-fifth aspect, alone or in combination with one or more of the forty-third through forty-fourth aspects, the downlink sequence is carried in a resource allocation associated with the at least one SPS occasion.

In a forty-sixth aspect, alone or in combination with the forty-fifth aspect, the downlink sequence comprises a demodulation reference signal carried in one or more symbols of the at least one SPS occasion.

In a forty-seventh aspect, alone or in combination with the forty-sixth aspect, the one or more symbols of the at least one SPS occasion are an ending one or more symbols of the at least one SPS occasion.

In a forty-eighth aspect, alone or in combination with one or more of the forty-third through forty-fifth aspects, the downlink sequence is carried outside of a resource allocation associated with the at least one SPS occasion.

In a forty-ninth aspect, alone or in combination with one or more of the forty-third through forty-eighth aspects, process 700 includes transmitting, to the base station, a dedicated feedback message that includes an acknowledgement or a negative acknowledgment associated with receiving the downlink sequence.

In a fiftieth aspect, alone or in combination with the forty-ninth aspect, the dedicated feedback message corresponds to at least one of a HARQ-ACK codebook type one, a HARQ-ACK codebook type 2, or a HARQ-ACK codebook type 3.

In a fifty-first aspect, alone or in combination with one or more of the forty-third through fiftieth aspects, the set of SPS occasions to be skipped indicated by the downlink sequence comprises an SPS occasion associated with the downlink sequence.

In a fifty-second aspect, alone or in combination with one or more of the forty-third through fifty-first aspects, the set of SPS occasions to be skipped indicated by the downlink sequence comprises a plurality of SPS occasions associated with the downlink sequence.

In a fifty-third aspect, alone or in combination with one or more of the forty-third through fifty-second aspects, the downlink sequence indicates a first start time associated with the set of SPS occasions to be skipped and a first duration of a time period associated with the set of SPS occasions to be skipped, and another downlink sequence indicates a second start time associated with the set of SPS occasions to be skipped and a second duration of a time period associated with the set of SPS occasions to be skipped.

In a fifty-fourth aspect, alone or in combination with one or more of the forty-third through fifty-third aspects, the SPS skipping indicator indicates an initial SPS occasion to occur of the set of SPS occasions to be skipped, wherein the initial SPS occasion to occur is indicated relative to an action time of the downlink sequence.

In a fifty-fifth aspect, alone or in combination with the fifty-fourth aspect, the initial SPS occasion to occur comprises an SPS occasion that occurs a specified quantity of symbols after an end of the downlink sequence.

In a fifty-sixth aspect, alone or in combination with the fifty-fifth aspects, the download sequence is associated with a dedicated feedback message.

In a fifty-seventh aspect, alone or in combination with the fifty-fifth aspects, the download sequence is not associated with a dedicated feedback message.

In a fifty-eighth aspect, alone or in combination with the fifty-fourth aspect, the initial SPS occasion to occur comprises an SPS occasion that occurs a specified quantity of symbols after an end of an uplink feedback transmission associated with the downlink sequence.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
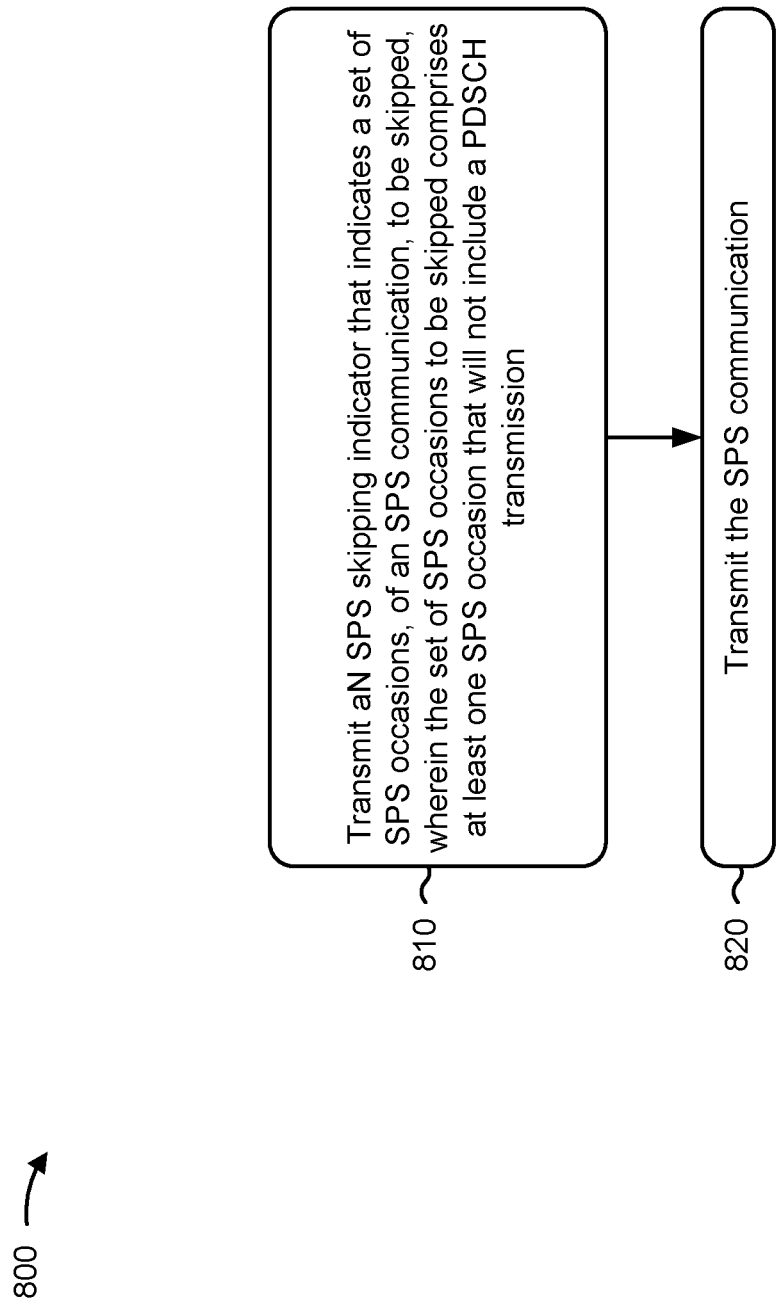
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 and/or the like) performs operations associated with UE feedback reduction for SPS.

As shown in FIG. 8, in some aspects, process 800 may include transmitting, to a UE, an SPS skipping indicator that indicates a set of SPS occasions, of an SPS communication, to be skipped, wherein the set of SPS occasions to be skipped comprises at least one SPS occasion that will not include a PDSCH transmission (block 810). For example, the base station (e.g., using transmit processor 220, controller/processor 240, memory 242, and/or the like) may transmit, to a UE, an SPS skipping indicator that indicates a set of SPS occasions, of an SPS communication, to be skipped, as described above. In some aspects, the set of SPS occasions to be skipped comprises at least one SPS occasion that will not include a PDSCH transmission.

As further shown in FIG. 8, in some aspects, process 800 may include transmitting the SPS communication (block 820). For example, the base station (e.g., using transmit processor 220, controller/processor 240, memory 242, and/or the like) may transmit the SPS communication, as described above.

Process 800 may include additional aspects, such as any single aspect or any combination of aspects described below and/or in connection with one or more other processes described elsewhere herein.

In a first aspect, the UE is to ignore the at least one SPS occasion by not transmitting a feedback message associated with the at least one SPS occasion.

In a second aspect, alone or in combination with the first aspect, the UE is to ignore the at least one SPS occasion by not performing SPS decoding associated with the at least one SPS occasion.

In a third aspect, alone or in combination with one or more of the first and second aspects, the SPS skipping indicator indicates at least one additional set of SPS occasions to be skipped, wherein the UE is to skip each SPS occasion of the at least one additional set of SPS occasions to be skipped.

In a fourth aspect, alone or in combination with one or more of the first through third aspects, the SPS skipping indicator indicates: an initial SPS occasion to occur of the set of SPS occasions to be skipped, and a quantity of SPS occasions of the set of SPS occasions to be skipped.

In a fifth aspect, alone or in combination with one or more of the first through fourth aspects, the SPS skipping indicator indicates: a start time associated with the set of SPS occasions to be skipped, and a duration of a time period associated with the set of SPS occasions to be skipped.

In a sixth aspect, alone or in combination with one or more of the first through fifth aspects, the SPS skipping indicator comprises a bit map that indicates the set of SPS occasions to be skipped.

In a seventh aspect, alone or in combination with one or more of the first through sixth aspects, the SPS skipping indicator is carried in a MAC-CE.

In an eighth aspect, alone or in combination with the seventh aspects, the MAC-CE is carried in a PDSCH transmission.

In a ninth aspect, alone or in combination with the eighth aspect, the PDSCH transmission comprises an SPS PDSCH transmission.

In a tenth aspect, alone or in combination with one or more of the seventh through ninth aspects, the SPS skipping indicator indicates an initial SPS occasion to occur of the set of SPS occasions to be skipped, wherein the initial SPS occasion to occur is indicated relative to an action time of the MAC-CE.

In an eleventh aspect, alone or in combination with the tenth aspect, the action time of the MAC-CE comprises at least one of an end of an ACK message corresponding to the MAC-CE or an end of a specified time period that begins after the end of the ACK message corresponding to the MAC-CE.

In a twelfth aspect, alone or in combination with one or more of the seventh through ninth aspects, the SPS skipping indicator does not indicate an initial SPS occasion to occur of the SPS occasions to be skipped, and a default initial SPS occasion to occur of the SPS occasions to be skipped comprises a next occasion to occur after an action time of the MAC-CE.

In a thirteenth aspect, alone or in combination with one or more of the seventh through twelfth aspects, the SPS skipping indicator indicates a start time associated with the set of SPS occasions to be skipped, wherein the start time is indicated relative to an action time of the MAC-CE.

In a fourteenth aspect, alone or in combination with the thirteenth aspect, the start time comprises a time that occurs after a specified time period beginning at the action time of the MAC-CE.

In a fifteenth aspect, alone or in combination with one or more of the thirteenth through fourteenth aspects, the start time is indicated relative to a start time of a frame associated with the MAC-CE or the action time of the MAC-CE.

In a sixteenth aspect, alone or in combination with one or more of the seventh through fifteenth aspects, the SPS skipping indicator comprises a bit map that indicates the set of SPS occasions to be skipped, wherein the bit map corresponds to a plurality of SPS occasions associated with a next cycle that occurs after a cycle containing an action time of the MAC-CE.

In a seventeenth aspect, alone or in combination with the sixteenth aspect, the bit map corresponds to a specified quantity of SPS occasions occurring after an action time of the MAC-CE.

In an eighteenth aspect, alone or in combination with the seventeenth aspect, the specified quantity comprises a fixed quantity configured in an RRC message.

In a nineteenth aspect, alone or in combination with the seventeenth aspect, the specified quantity comprises a dynamically-indicated quantity indicated in the MAC-CE.

In a twentieth aspect, alone or in combination with the first aspect, the SPS skipping indicator is carried in a DCI transmission.

In a twenty-first aspect, alone or in combination with the twentieth aspect, process 800 includes transmitting, to the UE, a radio resource control message that configures one or more data fields in the DCI transmission to carry the SPS skipping indicator.

In a twenty-second aspect, alone or in combination with one or more of the twentieth through twenty-first aspects, the DCI transmission comprises a DCI format that schedules at least one of uplink signals or downlink signals.

In a twenty-third aspect, alone or in combination with one or more of the twentieth through twenty-second aspects, the DCI transmission comprises a dedicated DCI format.

In a twenty-fourth aspect, alone or in combination with the twenty-third aspect, the DCI transmission does not affect one or more DRX timers, the one or more DRX timers comprising at least one of: a DRX inactivity timer, a DRX downlink retransmission timer, a DRX uplink retransmission timer, a DRX HARQ downlink retransmission timer, a DRX HARQ uplink retransmission timer, or a combination thereof.

In a twenty-fifth aspect, alone or in combination with one or more of the twenty-third through twenty-fourth aspects, process 800 includes receiving, from the UE, a dedicated feedback message that includes an acknowledgement or a negative acknowledgment associated with receiving the DCI transmission.

In a twenty-sixth aspect, alone or in combination with the twenty-fifth aspect, the dedicated feedback message corresponds to at least one of a HARQ-ACK codebook type one, a HARQ-ACK codebook type 2, or a HARQ-ACK codebook type 3.

In a twenty-seventh aspect, alone or in combination with one or more of the twentieth through twenty-sixth aspects, the SPS skipping indicator indicates an initial SPS occasion to occur of the set of SPS occasions to be skipped, wherein the initial SPS occasion to occur is indicated relative to an action time of a MAC-CE.

In a twenty-eighth aspect, alone or in combination with the twenty-seventh aspect, the action time of the MAC-CE comprises at least one of an end of an ACK message corresponding to the MAC-CE or an end of a specified time period that begins after the end of the ACK message corresponding to the MAC-CE.

In a twenty-ninth aspect, alone or in combination with one or more of the twentieth through twenty-eighth aspects, the SPS skipping indicator does not indicate an initial SPS occasion to occur of the SPS occasions to be skipped, and a configured default initial SPS occasion to occur of the SPS occasions to be skipped comprises a next occasion to occur after an action time of a MAC-CE.

In a thirtieth aspect, alone or in combination with one or more of the twentieth through twenty-ninth aspects, the SPS skipping indicator indicates a start time associated with the set of SPS occasions to be skipped, wherein the start time is indicated relative to an action time of a MAC-CE.

In a thirty-first aspect, alone or in combination with the thirtieth aspect, the start time comprises a time that occurs after a specified time period beginning at the action time of the MAC-CE.

In a thirty-second aspect, alone or in combination with one or more of the thirtieth through thirty-first aspects, the start time is indicated relative to a start time of a frame associated with the MAC-CE.

In a thirty-third aspect, alone or in combination with one or more of the twentieth through thirty-second aspects, the SPS skipping indicator comprises a bit map that indicates the set of SPS occasions to be skipped, wherein the bit map corresponds to a plurality of SPS occasions associated with a next cycle that occurs after a cycle containing an action time of a MAC-CE.

In a thirty-fourth aspect, alone or in combination with the thirty-third aspect, the bit map corresponds to a specified quantity of SPS occasions occurring after an action time of the MAC-CE.

In a thirty-fifth aspect, alone or in combination with the thirty-fourth aspect, the specified quantity comprises a fixed quantity configured in an RRC message.

In a thirty-sixth aspect, alone or in combination with one or more of the first through thirty-fifth aspects, the specified quantity comprises a dynamically-indicated quantity indicated in the MAC-CE.

In a thirty-seventh aspect, alone or in combination with the thirty-fourth aspect, the SPS skipping indicator indicates an initial SPS occasion to occur of the set of SPS occasions to be skipped, wherein the initial SPS occasion to occur is indicated relative to an action time of the DCI transmission.

In a thirty-eighth aspect, alone or in combination with the twentieth aspect, the initial SPS occasion to occur comprises an SPS occasion that occurs a specified quantity of symbols after an end of the DCI transmission.

In a thirty-ninth aspect, alone or in combination with the thirty-eighth aspect, the DCI transmission is associated with a dedicated feedback message.

In a fortieth aspect, alone or in combination with the thirty-eighth aspects, the DCI transmission is not associated with a dedicated feedback message.

In a forty-first aspect, alone or in combination with one or more of the thirty-eighth through fortieth aspects, the specified quantity of symbols is based at least in part on at least one of: an SCS of a scheduling CC carrying the DCI transmission, an SCS of a CC carrying the SPS communication, an SCS of a CC carrying an uplink feedback transmission associated with the DCI transmission, or a combination thereof.

In a forty-second aspect, alone or in combination with one or more of the thirty-seventh through forty-first aspects, the initial SPS occasion to occur comprises an SPS occasion that occurs a specified quantity of symbols after an end of an uplink feedback transmission associated with the DCI transmission.

In a forty-third aspect, alone or in combination with the forty-second aspect, the specified quantity of symbols is based at least in part on at least one of: an SCS of a scheduling CC carrying the DCI transmission, an SCS of a CC carrying the SPS communication, an SCS of a CC carrying an uplink feedback transmission associated with the DCI transmission, or a combination thereof.

In a forty-fourth aspect, alone or in combination with the forty-second aspect, the SPS skipping indicator is indicated by a downlink sequence.

In a forty-fifth aspect, alone or in combination with the forty-fourth aspect, the downlink sequence comprises at least one of a demodulation reference signal, a channel state information reference signal, or a combination thereof.

In a forty-sixth aspect, alone or in combination with one or more of the forty-fourth through forty-fifth aspects, the downlink sequence is carried in a resource allocation associated with the at least one SPS occasion.

In a forty-seventh aspect, alone or in combination with the forty-sixth aspect, the downlink sequence comprises a demodulation reference signal carried in one or more symbols of the at least one SPS occasion.

In a forty-eighth aspect, alone or in combination with the forty-seventh aspect, the one or more symbols of the at least one SPS occasion are an ending one or more symbols of the at least one SPS occasion.

In a forty-ninth aspect, alone or in combination with the forty-fourth aspect, the downlink sequence is carried outside of a resource allocation associated with the at least one SPS occasion.

In a fiftieth aspect, alone or in combination with one or more of the forty-fourth through forty-ninth aspects, process 800 includes receiving, from the UE, a dedicated feedback message that includes an acknowledgement or a negative acknowledgment associated with receiving the downlink sequence.

In a fifty-first aspect, alone or in combination with the fiftieth aspect, the dedicated feedback message corresponds to at least one of a HARQ-ACK codebook type one, a HARQ-ACK codebook type 2, or a HARQ-ACK codebook type 3.

In a fifty-second aspect, alone or in combination with one or more of the forty-fourth through fifty-first aspects, the set of SPS occasions to be skipped indicated by the downlink sequence comprises an SPS occasion associated with the downlink sequence.

In a fifty-third aspect, alone or in combination with one or more of the forty-fourth through fifty-second aspects, the set of SPS occasions to be skipped indicated by the downlink sequence comprises a plurality of SPS occasions associated with the downlink sequence.

In a fifty-fourth aspect, alone or in combination with one or more of the forty-fourth through fifty-third aspects, the downlink sequence indicates a first start time associated with the set of SPS occasions to be skipped and a first duration of a time period associated with the set of SPS occasions to be skipped, and another downlink sequence indicates a second start time associated with the set of SPS occasions to be skipped and a second duration of a time period associated with the set of SPS occasions to be skipped.

In a fifty-fifth aspect, alone or in combination with one or more of the forty-fourth through fifty-fourth aspects, the SPS skipping indicator indicates an initial SPS occasion to occur of the set of SPS occasions to be skipped, wherein the initial SPS occasion to occur is indicated relative to an action time of the downlink sequence.

In a fifty-sixth aspect, alone or in combination with the fifty-fifth aspect, the initial SPS occasion to occur comprises an SPS occasion that occurs a specified quantity of symbols after an end of the downlink sequence.

In a fifty-seventh aspect, alone or in combination with the fifty-sixth aspect, the download sequence is associated with a dedicated feedback message.

In a fifty-eighth aspect, alone or in combination with the fifty-sixth aspect, the download sequence is not associated with a dedicated feedback message.

In a fifty-ninth aspect, alone or in combination with one or more of the fifty-fifth through fifty-eighth aspects, the initial SPS occasion to occur comprises an SPS occasion that occurs a specified quantity of symbols after an end of an uplink feedback transmission associated with the downlink sequence.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some aspects of the present disclosure:

Aspect 1: A method of wireless communication performed by a user equipment (UE), comprising: receiving, from a base station, a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission; and ignoring the at least one SPS occasion of the set of SPS occasions by not transmitting a feedback message associated with the at least one SPS occasion.

Aspect 2: The method of aspect 1, wherein ignoring the at least one SPS occasion further comprises not performing SPS decoding associated with the at least one SPS occasion.

Aspect 3: The method of either of aspects 1 or 2, wherein the SPS skipping indicator indicates at least one additional set of SPS occasions to be skipped, wherein the method further comprises ignoring each SPS occasion of the at least one additional set of SPS occasions to be skipped.

Aspect 4: The method of any of aspects 1-3, wherein the SPS skipping indicator indicates: an initial SPS occasion to occur of the set of SPS occasions to be skipped; and a quantity of SPS occasions of the set of SPS occasions to be skipped.

Aspect 5: The method of any of aspects 1-4, wherein the SPS skipping indicator indicates: a start time associated with the set of SPS occasions to be skipped; and a duration of a time period associated with the set of SPS occasions to be skipped.

Aspect 6: The method of any of aspects 1-5, wherein the SPS skipping indicator comprises a bit map that indicates the set of SPS occasions to be skipped.

Aspect 7: The method of any of aspects 1-6, wherein the SPS skipping indicator is carried in a medium access control (MAC) control element (CE).

Aspect 8: The method of aspect 7, wherein the MAC-CE is carried in a PDSCH transmission.

Aspect 9: The method of aspect 8, wherein the PDSCH transmission comprises an SPS PDSCH transmission.

Aspect 10: The method of either of aspects 7 or 8, wherein the SPS skipping indicator indicates an initial SPS occasion to occur of the set of SPS occasions to be skipped, wherein the initial SPS occasion to occur is indicated relative to an action time of the MAC-CE.

Aspect 11: The method of aspect 10, wherein the action time of the MAC-CE comprises at least one of an end of an acknowledgement (ACK) message corresponding to the MAC-CE or an end of a specified time period that begins after the end of the ACK message corresponding to the MAC-CE.

Aspect 12: The method of either of aspects 7 or 8, wherein the SPS skipping indicator does not indicate an initial SPS occasion to occur of the SPS occasions to be skipped, and wherein a default initial SPS occasion to occur of the SPS occasions to be skipped comprises a next occasion to occur after an action time of the MAC-CE.

Aspect 13: The method of either of aspects 7 or 8, wherein the SPS skipping indicator indicates a start time associated with the set of SPS occasions to be skipped, wherein the start time is indicated relative to an action time of the MAC-CE.

Aspect 14: The method of aspect 13, wherein the start time comprises a time that occurs after a specified time period beginning at the action time of the MAC-CE.

Aspect 15: The method of aspect 13, wherein the start time is indicated relative to a start time of a frame associated with the MAC-CE or the action time of the MAC-CE.

Aspect 16: The method of either of aspects 7 or 8, wherein the SPS skipping indicator comprises a bit map that indicates the set of SPS occasions to be skipped, wherein the bit map corresponds to a plurality of SPS occasions associated with a next cycle that occurs after a cycle containing an action time of the MAC-CE.

Aspect 17: The method of aspect 16, wherein the bit map corresponds to a specified quantity of SPS occasions occurring after an action time of the MAC-CE.

Aspect 18: The method of aspect 17, wherein the specified quantity comprises a fixed quantity configured in a radio resource control message.

Aspect 19: The method of aspect 17, wherein the specified quantity comprises a dynamically-indicated quantity indicated in the MAC-CE.

Aspect 20: The method of aspect 1, wherein the SPS skipping indicator is carried in a downlink control information (DCI) transmission.

Aspect 21: The method of aspect 20, further comprising receiving, from the base station, a radio resource control message that configures one or more data fields in the DCI transmission to carry the SPS skipping indicator.

Aspect 22: The method of either of aspects 20 or 21, wherein the DCI transmission comprises a DCI format that schedules at least one of uplink signals or downlink signals.

Aspect 23: The method of any of aspects 20-22, wherein the DCI transmission comprises a dedicated DCI format.

Aspect 24: The method of aspect 23, wherein the DCI transmission does not affect one or more discontinuous reception (DRX) timers, the one or more DRX timers comprising at least one of: a DRX inactivity timer, a DRX downlink retransmission timer, a DRX uplink retransmission timer, a DRX hybrid automatic repeat request (HARQ) downlink retransmission timer, a DRX HARQ uplink retransmission timer, or a combination thereof.

Aspect 25: The method of either of aspects 23 or 24, further comprising transmitting, to the base station, a dedicated feedback message that includes an acknowledgement or a negative acknowledgment associated with receiving the DCI transmission.

Aspect 26: The method of aspect 25, wherein the dedicated feedback message corresponds to at least one of a hybrid automatic repeat request acknowledgement (HARQ-ACK) codebook type one, a HARQ-ACK codebook type 2, or a HARQ-ACK codebook type 3.

Aspect 27: The method of any of aspects 20-26, wherein the SPS skipping indicator indicates an initial SPS occasion to occur of the set of SPS occasions to be skipped, wherein the initial SPS occasion to occur is indicated relative to an action time of a MAC-CE.

Aspect 28: The method of aspect 27, wherein the action time of the MAC-CE comprises at least one of an end of an acknowledgement (ACK) message corresponding to the MAC-CE or an end of a specified time period that begins after the end of the ACK message corresponding to the MAC-CE.

Aspect 29: The method of aspect 20, wherein the SPS skipping indicator does not indicate an initial SPS occasion to occur of the SPS occasions to be skipped, and wherein a configured default initial SPS occasion to occur of the SPS occasions to be skipped comprises a next occasion to occur after an action time of a MAC-CE.

Aspect 30: The method of any of aspects 20-29, wherein the SPS skipping indicator indicates a start time associated with the set of SPS occasions to be skipped, wherein the start time is indicated relative to an action time of a MAC-CE.

Aspect 31: The method of aspect 30, wherein the start time comprises a time that occurs after a specified time period beginning at the action time of the MAC-CE.

Aspect 32: The method of either of aspects 30 or 31, wherein the start time is indicated relative to a start time of a frame associated with the MAC-CE.

Aspect 33: The method of any of aspects 20-32, wherein the SPS skipping indicator comprises a bit map that indicates the set of SPS occasions to be skipped, wherein the bit map corresponds to a plurality of SPS occasions associated with a next cycle that occurs after a cycle containing an action time of a MAC-CE.

Aspect 34: The method of aspect 33, wherein the bit map corresponds to a specified quantity of SPS occasions occurring after an action time of the MAC-CE.

Aspect 35: The method of aspect 34, wherein the specified quantity comprises a fixed quantity configured in a radio resource control message.

Aspect 36: The method of aspect 34, wherein the specified quantity comprises a dynamically-indicated quantity indicated in the MAC-CE.

Aspect 37: The method of aspect 20, wherein the SPS skipping indicator indicates an initial SPS occasion to occur of the set of SPS occasions to be skipped, wherein the initial SPS occasion to occur is indicated relative to an action time of the DCI transmission.

Aspect 38: The method of aspect 37, wherein the initial SPS occasion to occur comprises an SPS occasion that occurs a specified quantity of symbols after an end of the DCI transmission.

Aspect 39: The method of aspect 38, wherein the DCI transmission is associated with a dedicated feedback message.

Aspect 40: The method of aspect 38, wherein the DCI transmission is not associated with a dedicated feedback message.

Aspect 41: The method of any of aspects 38-40, wherein the specified quantity of symbols is based at least in part on at least one of: a subcarrier spacing (SCS) of a scheduling component carrier (CC) carrying the DCI transmission, an SCS of a CC carrying the SPS communication, an SCS of a CC carrying an uplink feedback transmission associated with the DCI transmission, or a combination thereof.

Aspect 42: The method of any of aspects 38-41, wherein the initial SPS occasion to occur comprises an SPS occasion that occurs a specified quantity of symbols after an end of an uplink feedback transmission associated with the DCI transmission.

Aspect 43: The method of aspect 42, wherein the specified quantity of symbols is based at least in part on at least one of: a subcarrier spacing (SCS) of a scheduling component carrier (CC) carrying the DCI transmission, an SCS of a CC carrying the SPS communication, an SCS of a CC carrying the uplink feedback message associated with the DCI transmission, or a combination thereof.

Aspect 44: The method of aspect 1, wherein the SPS skipping indicator is indicated by a downlink sequence.

Aspect 45: The method of aspect 44, wherein the downlink sequence comprises at least one of a demodulation reference signal, a channel state information reference signal, or a combination thereof.

Aspect 46: The method of either of aspects 44 or 45, wherein the downlink sequence is carried in a resource allocation associated with the at least one SPS occasion.

Aspect 47: The method of aspect 46, wherein the downlink sequence comprises a demodulation reference signal carried in one or more symbols of the at least one SPS occasion.

Aspect 48: The method of aspect 47, wherein the one or more symbols of the at least one SPS occasion are an ending one or more symbols of the at least one SPS occasion.

Aspect 49: The method of either of aspects 44 or 45, wherein the downlink sequence is carried outside of a resource allocation associated with the at least one SPS occasion.

Aspect 50: The method of any of aspects 44-49, further comprising transmitting, to the base station, a dedicated feedback message that includes an acknowledgement or a negative acknowledgment associated with receiving the downlink sequence.

Aspect 51: The method of aspect 50, wherein the dedicated feedback message corresponds to at least one of a hybrid automatic repeat request acknowledgement (HARQ-ACK) codebook type one, a HARQ-ACK codebook type 2, or a HARQ-ACK codebook type 3.

Aspect 52: The method of any of aspects 44-51, wherein the set of SPS occasions to be skipped indicated by the downlink sequence comprises an SPS occasion associated with the downlink sequence.

Aspect 53: The method of any of aspects 44-52, wherein the set of SPS occasions to be skipped indicated by the downlink sequence comprises a plurality of SPS occasions associated with the downlink sequence.

Aspect 54: The method of any of aspects 44-53, wherein the downlink sequence indicates a first start time associated with the set of SPS occasions to be skipped and a first duration of a time period associated with the set of SPS occasions to be skipped, and wherein another downlink sequence indicates a second start time associated with the set of SPS occasions to be skipped and a second duration of a time period associated with the set of SPS occasions to be skipped.

Aspect 55: The method of any of aspects 44-54, wherein the SPS skipping indicator indicates an initial SPS occasion to occur of the set of SPS occasions to be skipped, wherein the initial SPS occasion to occur is indicated relative to an action time of the downlink sequence.

Aspect 56: The method of aspect 55, wherein the initial SPS occasion to occur comprises an SPS occasion that occurs a specified quantity of symbols after an end of the downlink sequence.

Aspect 57: The method of aspect 56, wherein the download sequence is associated with a dedicated feedback message.

Aspect 58: The method of aspect 56, wherein the download sequence is not associated with a dedicated feedback message.

Aspect 59: The method of aspect 55, wherein the initial SPS occasion to occur comprises an SPS occasion that occurs a specified quantity of symbols after an end of an uplink feedback transmission associated with the downlink sequence.

Aspect 60: A method of wireless communication performed by a base station, comprising: transmitting, to a user equipment (UE), a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission; and transmitting the SPS communication.

Aspect 61: The method of aspect 60, wherein the UE is to ignore the at least one SPS occasion by not transmitting a feedback message associated with the at least one SPS occasion.

Aspect 62: The method of either of aspects 60 or 61, wherein the UE is to ignore the at least one SPS occasion by not performing SPS decoding associated with the at least one SPS occasion.

Aspect 63: The method of any of aspects 60-62, wherein the SPS skipping indicator indicates at least one additional set of SPS occasions to be skipped, wherein the UE is to skip each SPS occasion of the at least one additional set of SPS occasions to be skipped.

Aspect 64: The method of any of aspects 60-63, wherein the SPS skipping indicator indicates: an initial SPS occasion to occur of the set of SPS occasions to be skipped; and a quantity of SPS occasions of the set of SPS occasions to be skipped.

Aspect 65: The method of any of aspects 60-64, wherein the SPS skipping indicator indicates: a start time associated with the set of SPS occasions to be skipped; and a duration of a time period associated with the set of SPS occasions to be skipped.

Aspect 66: The method of any of aspects 60-65, wherein the SPS skipping indicator comprises a bit map that indicates the set of SPS occasions to be skipped.

Aspect 67: The method of any of aspects 60-66, wherein the SPS skipping indicator is carried in a medium access control (MAC) control element (CE).

Aspect 68: The method of aspect 67, wherein the MAC-CE is carried in a PDSCH transmission.

Aspect 69: The method of aspect 68, wherein the PDSCH transmission comprises an SPS PDSCH transmission.

Aspect 70: The method of any of aspects 67-69, wherein the SPS skipping indicator indicates an initial SPS occasion to occur of the set of SPS occasions to be skipped, wherein the initial SPS occasion to occur is indicated relative to an action time of the MAC-CE.

Aspect 71: The method of aspect 70, wherein the action time of the MAC-CE comprises at least one of an end of an acknowledgement (ACK) message corresponding to the MAC-CE or an end of a specified time period that begins after the end of the ACK message corresponding to the MAC-CE.

Aspect 72: The method of any of aspects 67-69, wherein the SPS skipping indicator does not indicate an initial SPS occasion to occur of the SPS occasions to be skipped, and wherein a default initial SPS occasion to occur of the SPS occasions to be skipped comprises a next occasion to occur after an action time of the MAC-CE.

Aspect 73: The method of any of aspects 67-72, wherein the SPS skipping indicator indicates a start time associated with the set of SPS occasions to be skipped, wherein the start time is indicated relative to an action time of the MAC-CE.

Aspect 74: The method of aspect 73, wherein the start time comprises a time that occurs after a specified time period beginning at the action time of the MAC-CE.

Aspect 75: The method of either of aspects 73 or 74, wherein the start time is indicated relative to a start time of a frame associated with the MAC-CE or the action time of the MAC-CE.

Aspect 76: The method of any of aspects 67-75, wherein the SPS skipping indicator comprises a bit map that indicates the set of SPS occasions to be skipped, wherein the bit map corresponds to a plurality of SPS occasions associated with a next cycle that occurs after a cycle containing an action time of the MAC-CE.

Aspect 77: The method of aspect 76, wherein the bit map corresponds to a specified quantity of SPS occasions occurring after an action time of the MAC-CE.

Aspect 78: The method of aspect 77, wherein the specified quantity comprises a fixed quantity configured in a radio resource control message.

Aspect 79: The method of aspect 77, wherein the specified quantity comprises a dynamically-indicated quantity indicated in the MAC-CE.

Aspect 80: The method of aspect 60, wherein the SPS skipping indicator is carried in a downlink control information (DCI) transmission.

Aspect 81: The method of aspect 80, further comprising transmitting, to the UE, a radio resource control message that configures one or more data fields in the DCI transmission to carry the SPS skipping indicator.

Aspect 82: The method of either of aspects 80 or 81, wherein the DCI transmission comprises a DCI format that schedules at least one of uplink signals or downlink signals.

Aspect 83: The method of any of aspects 80-82, wherein the DCI transmission comprises a dedicated DCI format.

Aspect 84: The method of aspect 83, wherein the DCI transmission does not affect one or more discontinuous reception (DRX) timers, the one or more DRX timers comprising at least one of: a DRX inactivity timer, a DRX downlink retransmission timer, a DRX uplink retransmission timer, a DRX hybrid automatic repeat request (HARQ) downlink retransmission timer, a DRX HARQ uplink retransmission timer, or a combination thereof.

Aspect 85: The method of either of aspects 83 or 84, further comprising receiving, from the UE, a dedicated feedback message that includes an acknowledgement or a negative acknowledgment associated with receiving the DCI transmission.

Aspect 86: The method of aspect 85, wherein the dedicated feedback message corresponds to at least one of a hybrid automatic repeat request acknowledgement (HARQ-ACK) codebook type one, a HARQ-ACK codebook type 2, or a HARQ-ACK codebook type 3.

Aspect 87: The method of any of aspects 80-86, wherein the SPS skipping indicator indicates an initial SPS occasion to occur of the set of SPS occasions to be skipped, wherein the initial SPS occasion to occur is indicated relative to an action time of a MAC-CE.

Aspect 88: The method of aspect 87, wherein the action time of the MAC-CE comprises at least one of an end of an acknowledgement (ACK) message corresponding to the MAC-CE or an end of a specified time period that begins after the end of the ACK message corresponding to the MAC-CE.

Aspect 89: The method of any of aspects 80-86, wherein the SPS skipping indicator does not indicate an initial SPS occasion to occur of the SPS occasions to be skipped, and wherein a configured default initial SPS occasion to occur of the SPS occasions to be skipped comprises a next occasion to occur after an action time of a MAC-CE.

Aspect 90: The method of any of aspects 80-89, wherein the SPS skipping indicator indicates a start time associated with the set of SPS occasions to be skipped, wherein the start time is indicated relative to an action time of a MAC-CE.

Aspect 91: The method of aspect 90, wherein the start time comprises a time that occurs after a specified time period beginning at the action time of the MAC-CE.

Aspect 92: The method of either of aspects 90 or 91, wherein the start time is indicated relative to a start time of a frame associated with the MAC-CE.

Aspect 93: The method of any of aspects 80-92, wherein the SPS skipping indicator comprises a bit map that indicates the set of SPS occasions to be skipped, wherein the bit map corresponds to a plurality of SPS occasions associated with a next cycle that occurs after a cycle containing an action time of a MAC-CE.

Aspect 94: The method of aspect 93, wherein the bit map corresponds to a specified quantity of SPS occasions occurring after an action time of the MAC-CE.

Aspect 95: The method of aspect 94, wherein the specified quantity comprises a fixed quantity configured in a radio resource control message.

Aspect 96: The method of aspect 94, wherein the specified quantity comprises a dynamically-indicated quantity indicated in the MAC-CE.

Aspect 97: The method of aspect 80, wherein the SPS skipping indicator indicates an initial SPS occasion to occur of the set of SPS occasions to be skipped, wherein the initial SPS occasion to occur is indicated relative to an action time of the DCI transmission.

Aspect 98: The method of aspect 97, wherein the initial SPS occasion to occur comprises an SPS occasion that occurs a specified quantity of symbols after an end of the DCI transmission.

Aspect 99: The method of aspect 98, wherein the DCI transmission is associated with a dedicated feedback message.

Aspect 100: The method of aspect 98, wherein the DCI transmission is not associated with a dedicated feedback message.

Aspect 101: The method of any of aspects 98-100, wherein the specified quantity of symbols is based at least in part on at least one of: a subcarrier spacing (SCS) of a scheduling component carrier (CC) carrying the DCI transmission, an SCS of a CC carrying the SPS communication, an SCS of a CC carrying an uplink feedback transmission associated with the DCI transmission, or a combination thereof.

Aspect 102: The method of any of aspects 97-101, wherein the initial SPS occasion to occur comprises an SPS occasion that occurs a specified quantity of symbols after an end of an uplink feedback transmission associated with the DCI transmission.

Aspect 103: The method of aspect 102, wherein the specified quantity of symbols is based at least in part on at least one of: a subcarrier spacing (SCS) of a scheduling component carrier (CC) carrying the DCI transmission, an SCS of a CC carrying the SPS communication, an SCS of a CC carrying the uplink feedback message associated with the DCI transmission, or a combination thereof.

Aspect 104: The method of aspect 60, wherein the SPS skipping indicator is indicated by a downlink sequence.

Aspect 105: The method of aspect 104, wherein the downlink sequence comprises at least one of a demodulation reference signal, a channel state information reference signal, or a combination thereof.

Aspect 106: The method of either of aspects 104 or 105, wherein the downlink sequence is carried in a resource allocation associated with the at least one SPS occasion.

Aspect 107: The method of aspect 106, wherein the downlink sequence comprises a demodulation reference signal carried in one or more symbols of the at least one SPS occasion.

Aspect 108: The method of aspect 107, wherein the one or more symbols of the at least one SPS occasion are an ending one or more symbols of the at least one SPS occasion.

Aspect 109: The method of aspect 104, wherein the downlink sequence is carried outside of a resource allocation associated with the at least one SPS occasion.

Aspect 110: The method of any of aspects 104-109, further comprising receiving, from the UE, a dedicated feedback message that includes an acknowledgement or a negative acknowledgment associated with receiving the downlink sequence.

Aspect 111: The method of aspect 110, wherein the dedicated feedback message corresponds to at least one of a hybrid automatic repeat request acknowledgement (HARQ-ACK) codebook type one, a HARQ-ACK codebook type 2, or a HARQ-ACK codebook type 3.

Aspect 112: The method of any of aspects 104-111, wherein the set of SPS occasions to be skipped indicated by the downlink sequence comprises an SPS occasion associated with the downlink sequence.

Aspect 113: The method of any of aspects 104-112, wherein the set of SPS occasions to be skipped indicated by the downlink sequence comprises a plurality of SPS occasions associated with the downlink sequence.

Aspect 114: The method of any of aspects 104-113, wherein the downlink sequence indicates a first start time associated with the set of SPS occasions to be skipped and a first duration of a time period associated with the set of SPS occasions to be skipped, and wherein another downlink sequence indicates a second start time associated with the set of SPS occasions to be skipped and a second duration of a time period associated with the set of SPS occasions to be skipped.

Aspect 115: The method of any of aspects 104-114, wherein the SPS skipping indicator indicates an initial SPS occasion to occur of the set of SPS occasions to be skipped, wherein the initial SPS occasion to occur is indicated relative to an action time of the downlink sequence.

Aspect 116: The method of aspect 115, wherein the initial SPS occasion to occur comprises an SPS occasion that occurs a specified quantity of symbols after an end of the downlink sequence.

Aspect 117: The method of aspect 116, wherein the download sequence is associated with a dedicated feedback message.

Aspect 118: The method of aspect 116, wherein the download sequence is not associated with a dedicated feedback message.

Aspect 119: The method of aspect 115, wherein the initial SPS occasion to occur comprises an SPS occasion that occurs a specified quantity of symbols after an end of an uplink feedback transmission associated with the downlink sequence.

Aspect 120: An apparatus for wireless communication at a device, comprising a processor; memory coupled with the processor; and instructions stored in the memory and executable by the processor to cause the apparatus to perform the method of one or more aspects of aspects 1-59.

Aspect 121: A device for wireless communication, comprising a memory and one or more processors coupled to the memory, the memory and the one or more processors configured to perform the method of one or more aspects of aspects 1-59.

Aspect 122: An apparatus for wireless communication, comprising at least one means for performing the method of one or more aspects of aspects 1-59.

Aspect 123: A non-transitory computer-readable medium storing code for wireless communication, the code comprising instructions executable by a processor to perform the method of one or more aspects of aspects 1-59.

Aspect 124: A non-transitory computer-readable medium storing a set of instructions for wireless communication, the set of instructions comprising one or more instructions that, when executed by one or more processors of a device, cause the device to perform the method of one or more aspects of aspects 1-59.

Aspect 125: An apparatus for wireless communication at a device, comprising a processor; memory coupled with the processor; and instructions stored in the memory and executable by the processor to cause the apparatus to perform the method of one or more aspects of aspects 60-119.

Aspect 126: A device for wireless communication, comprising a memory and one or more processors coupled to the memory, the memory and the one or more processors configured to perform the method of one or more aspects of aspects 60-119.

Aspect 127: An apparatus for wireless communication, comprising at least one means for performing the method of one or more aspects of aspects 60-119.

Aspect 128: A non-transitory computer-readable medium storing code for wireless communication, the code comprising instructions executable by a processor to perform the method of one or more aspects of aspects 60-119.

Aspect 129: A non-transitory computer-readable medium storing a set of instructions for wireless communication, the set of instructions comprising one or more instructions that, when executed by one or more processors of a device, cause the device to perform the method of one or more aspects of aspects 60-119.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive, from a network entity and via a downlink sequence, a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission, and wherein the downlink sequence is carried in a resource allocation associated with the at least one SPS occasion; and
      ignore the at least one SPS occasion of the set of SPS occasions by not transmitting a feedback message associated with the at least one SPS occasion.

2. The UE of claim 1, wherein the SPS skipping indicator is carried in a downlink control information (DCI) transmission.

3. The UE of claim 2, wherein the one or more processors are further configured to receive, from the network entity, a radio resource control message that configures one or more data fields in the DCI transmission to carry the SPS skipping indicator.

4. The UE of claim 2, wherein the DCI transmission comprises a DCI format that schedules at least one of uplink signals or downlink signals.

5. The UE of claim 2, wherein the DCI transmission comprises a dedicated DCI format.

6. The UE of claim 5, wherein the DCI transmission does not affect one or more discontinuous reception (DRX) timers, the one or more DRX timers comprising at least one of:
a DRX inactivity timer,
a DRX downlink retransmission timer,
a DRX uplink retransmission timer,
a DRX hybrid automatic repeat request (HARQ) downlink retransmission timer,
a DRX HARQ uplink retransmission timer, or
a combination thereof.

7. The UE of claim 2, wherein the one or more processors are further configured to transmit, to the network entity, a dedicated feedback message that includes an acknowledgement or a negative acknowledgment associated with receiving the DCI transmission.

8. The UE of claim 7, wherein the dedicated feedback message corresponds to at least one of a hybrid automatic repeat request acknowledgement (HARQ-ACK) codebook type one, a HARQ-ACK codebook type 2, or a HARQ-ACK codebook type 3.

9. The UE of claim 1, wherein the SPS skipping indicator indicates an initial SPS occasion to occur of the set of SPS occasions to be skipped, wherein the initial SPS occasion to occur is indicated relative to an action time of a medium access control (MAC)-control element (MAC-CE).

10. The UE of claim 9, wherein the action time of the MAC-CE comprises at least one of an end of an acknowledgement (ACK) message corresponding to the MAC-CE or an end of a specified time period that begins after the end of the ACK message corresponding to the MAC-CE.

11. The UE of claim 1, wherein the SPS skipping indicator does not indicate an initial SPS occasion to occur of the SPS occasions to be skipped, and wherein a configured default initial SPS occasion to occur of the SPS occasions to be skipped comprises a next occasion to occur after an action time of a medium access control (MAC)-control element (MAC-CE).

12. The UE of claim 1, wherein the SPS skipping indicator indicates a start time associated with the set of SPS occasions to be skipped, wherein the start time is indicated relative to an action time of medium access control (MAC)-control element (MAC-CE).

13. The UE of claim 12, wherein the start time comprises a time that occurs after a specified time period beginning at the action time of the MAC-CE.

14. The UE of claim 12, wherein the start time is indicated relative to a start time of a frame associated with the MAC-CE.

15. The UE of claim 1, wherein the SPS skipping indicator comprises a bit map that indicates the set of SPS occasions to be skipped, wherein the bit map corresponds to a plurality of SPS occasions associated with a next cycle that occurs after a cycle containing an action time of a medium access control (MAC)-control element (MAC-CE).

16. The UE of claim 15, wherein the bit map corresponds to a specified quantity of SPS occasions occurring after an action time of the MAC-CE.

17. The UE of claim 16, wherein the specified quantity comprises a fixed quantity configured in a radio resource control message.

18. The UE of claim 1, wherein the SPS skipping indicator is indicated by the downlink sequence.

19. The UE of claim 1, wherein the downlink sequence comprises at least one of a demodulation reference signal, a channel state information reference signal, or a combination thereof.

20. The UE of claim 1, wherein the downlink sequence comprises a demodulation reference signal carried in one or more symbols of the at least one SPS occasion.

21. The UE of claim 20, wherein the one or more symbols of the at least one SPS occasion are an ending one or more symbols of the at least one SPS occasion.

22. The UE of claim 1, wherein the one or more processors are further configured to transmit, to the network entity, a dedicated feedback message that includes an acknowledgement or a negative acknowledgment associated with receiving the downlink sequence.

23. The UE of claim 22, wherein the dedicated feedback message corresponds to at least one of a hybrid automatic repeat request acknowledgement (HARQ-ACK) codebook type one, a HARQ-ACK codebook type 2, or a HARQ-ACK codebook type 3.

24. The UE of claim 1, wherein the set of SPS occasions to be skipped is indicated by the downlink sequence and comprises at least one SPS occasion associated with the downlink sequence.

25. The UE of claim 1, wherein the downlink sequence indicates a first start time associated with the set of SPS occasions to be skipped and a first duration of a time period associated with the set of SPS occasions to be skipped, and wherein another downlink sequence indicates a second start time associated with the set of SPS occasions to be skipped and a second duration of a time period associated with the set of SPS occasions to be skipped.

26. A network entity for wireless communication, comprising:
a memory; and
one or more processors coupled to the memory, the one or more processors configured to:
transmit, to a user equipment (UE) and via a downlink sequence, a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission, and wherein the downlink sequence comprises a demodulation reference signal carried in one or more symbols of the at least one SPS occasion; and
transmit the SPS communication.

27. A method of wireless communication performed by a user equipment (UE), comprising:
receiving, from a network entity and via a downlink sequence, a semi-persistent scheduling (SPS) skipping indicator that indicates a set of SPS occasions, of an SPS communication, to be skipped, wherein the set of SPS occasions to be skipped comprises at least one SPS occasion that will not include a physical downlink shared channel (PDSCH) transmission, and wherein the downlink sequence is carried in a resource allocation associated with the at least one SPS occasion; and ignoring the at least one SPS occasion of the set of SPS occasions by not transmitting a feedback message associated with the at least one SPS occasion.

28. The method of claim 27, wherein the downlink sequence comprises a demodulation reference signal.

29. The method of claim 27, wherein the SPS skipping indicator comprises a bit map that indicates the set of SPS occasions to be skipped.

30. The method of claim 27, further comprising:

transmitting a feedback message that includes an acknowledgement or a negative acknowledgment associated with receiving the downlink sequence.

* * * * *